(12) United States Patent
Ling et al.

(10) Patent No.: US 11,791,889 B2
(45) Date of Patent: Oct. 17, 2023

(54) BEAM SELECTION METHOD AND APPARATUS

(71) Applicant: Huawei Technologies Co., Ltd., Shenzhen (CN)

(72) Inventors: Cen Ling, Shanghai (CN); Xiaoyong Yu, Shanghai (CN); Yong Cheng, Shenzhen (CN); Bin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/606,529

(22) PCT Filed: Apr. 20, 2020

(86) PCT No.: PCT/CN2020/085513
§ 371 (c)(1),
(2) Date: Oct. 26, 2021

(87) PCT Pub. No.: WO2020/216159
PCT Pub. Date: Oct. 29, 2020

(65) Prior Publication Data
US 2022/0216907 A1 Jul. 7, 2022

(30) Foreign Application Priority Data

Apr. 26, 2019 (CN) .......................... 201910346557.3

(51) Int. Cl.
*H04B 7/08* (2006.01)

(52) U.S. Cl.
CPC .......... *H04B 7/0888* (2013.01); *H04B 7/086* (2013.01); *H04B 7/0857* (2013.01)

(58) Field of Classification Search
CPC .... H04B 7/0888; H04B 7/0857; H04B 7/086; H04B 7/0617; H04B 7/0404;
(Continued)

(56) References Cited

U.S. PATENT DOCUMENTS

| 6,782,277 B1 | 8/2004 | Chen et al. |
| 2010/0315289 A1 | 12/2010 | Nurmela et al. |
| 2012/0220238 A1 | 8/2012 | Hosoya et al. |
| 2013/0040682 A1 | 2/2013 | Chang et al. |
| 2013/0090115 A1 | 4/2013 | Deivasigamani et al. |

(Continued)

FOREIGN PATENT DOCUMENTS

| CN | 1953348 A | 4/2007 |
| CN | 101656971 A | 2/2010 |

(Continued)

OTHER PUBLICATIONS

Machine Translation of CN-106851560-A (Year: 2023).*

(Continued)

*Primary Examiner* — Jean B Corrielus
(74) *Attorney, Agent, or Firm* — Conley Rose, P.C.

(57) ABSTRACT

A beam selection method includes determining, by a terminal, a first angular power spectrum of a low frequency channel transmitted between the terminal and an access network device, determining, by the terminal, a first high frequency beam scanning range based on the first angular power spectrum, and scanning, by the terminal, the first high frequency beam scanning range for a high frequency beam of the access network device.

20 Claims, 11 Drawing Sheets

(58) Field of Classification Search
CPC .... H04B 7/0408; H04W 72/02; H04W 72/04; H04W 72/046
See application file for complete search history.

(56) References Cited

U.S. PATENT DOCUMENTS

2014/0292577 A1  10/2014  Hosoya et al.
2020/0007292 A1  1/2020   Huang et al.

FOREIGN PATENT DOCUMENTS

| CN | 108809600 A | | 11/2018 | |
|---|---|---|---|---|
| CN | 111954229 A | * | 11/2020 | ............ H04W 16/18 |
| EP | 2887562 A1 | * | 6/2015 | ........... H04B 7/0617 |
| EP | 2887562 A1 | | 6/2015 | |
| GB | 2514548 A | * | 12/2014 | ........... G01S 5/0284 |
| JP | 2008113450 A | | 5/2008 | |
| JP | 2014527749 A | | 10/2014 | |
| JP | 2014534679 A | | 12/2014 | |
| WO | 2011055535 A1 | | 5/2011 | |
| WO | 2013022161 A1 | | 2/2013 | |
| WO | 2013052267 A1 | | 4/2013 | |
| WO | WO-2016106491 A1 | * | 7/2016 | ........... G01S 1/0428 |

OTHER PUBLICATIONS

Machine Translation of WO-2016106491-A1 (Year: 2023).*
3rd Generation Partnership Project; Technical Specification Group Radio Access Network; Study on New Radio Access Technology Physical Layer Aspects, 3GPP TR 38.802 V14.2.0, Sep. 2017, 144 pages.
Jonas Medbo et al., Ericsson Research: Frequency Dependency of Measured Highly Resolved Directional Propagatior Channel Characteristics, European Wireless 2016, Feb. 2017, 6 pages.
Anum Ali et al., University of Texas: Millimeter Wave Beam-Selection Using Out-of-Band Spatial Information, Feb. 27, 2017, 30 pages.
Chethan Kumar Anjinappa et al., Angular and Temporal Correlation of V2X Channels Across Sub-6 GHz and mmWave Bands, North Carolina State University, North Carolina State University, Apr. 6, 2018, 6 pages.
Wei Fan et al., Comparative study of centimetric and millimetric propagation channels in indoor environments, Deparlment of Electronic Systems, Faculty of Engineering and Science, Aalborg University, Denmark, IEEE, Apr. 10-15, 2016, 5 pages.
Michael Peter et al., mmMagic WhiteBook: Deliverable D2.1 Measurement Campaigns and Initial Channel Models for Preferred Suitable Frequency Ranges v1.0, Mar. 31, 2016, 144 pages.
3GPP TR 38.804 V14.0.0, 3rd Generation Partnership Project; Technical Specification Group Radio Access Network Study on New Radio Access Technology; Radio Interface Protocol Aspects, Mar. 2017, 57 pages.
3GPP TR 38.901 V15.0.0, 3rd Generation Partnership Project; Technical Specification Group Radio Access Network Study on channel model for frequencies from 0.5 to 100 GHz, Jun. 2018, 91 pages.

* cited by examiner

BEAM SELECTION METHOD AND APPARATUS

CROSS-REFERENCE TO RELATED APPLICATIONS

This is a U.S. National Stage of International Patent Application No. PCT/CN2020/085513 filed on Apr. 20, 2020, which claims priority to Chinese Patent Application No. 201910346557.3 filed on Apr. 26, 2019. Both of the aforementioned applications are hereby incorporated by reference in their entireties.

TECHNICAL FIELD

Embodiments of this application relate to the field of communications technologies, and in particular, to a beam selection method and an apparatus.

BACKGROUND

With development of communications technologies, a carrier aggregation (carrier aggregation, CA) manner based on high and low frequency coordination becomes an inevitable development trend of a future new radio (new radio, NR) network. For example, in the NR network, a terminal and a base station may transmit a signal on a low frequency band carrier, and may also transmit a signal on a millimeter wave frequency band. However, because the millimeter wave frequency band is featured in relatively high attenuation, a relatively weak diffraction capability, and the like, problems such as significant signal fading and an increased path loss are easily caused by transmitting the signal on the millimeter wave frequency band. To avoid these problems, the base station and the terminal may transmit a signal by using a high frequency beamforming technology. For example, the terminal (or the base station) may perform high frequency beamforming on a to-be-transmitted signal by using an antenna array, to form a precise narrow high frequency beam, and then send the high frequency beam to the base station (or the terminal). The base station (or the terminal) may form a precise narrow high frequency beam by using the high frequency beamforming technology to receive a signal sent by the terminal (or the base station). In this way, channel quality of a transmission channel between the base station and the terminal can be improved, and the problems such as the significant signal fading and the increased path loss caused by communication on the millimeter wave frequency band can be overcome.

A plurality of high frequency beams may be formed between the base station and the terminal, and signal quality of the high frequency beams may be different. Currently, a high frequency beam with optimal signal quality between the base station and the terminal is obtained in the 3rd generation partnership project (3rd generation partnership project, 3GPP) NR protocol in phases P1 to P3 in which stage-by-stage scanning is performed to first obtain a wide beam and then obtain a narrow beam. Phase P1: Obtain wide beams of the base station and the terminal. Phase P2: Obtain a narrow beam of the base station. Phase P3: Obtain a narrow beam of the terminal. For example, 15 wide beams are configured on the base station side, and each wide beam includes 10 narrow beams. The terminal side may first find several beams from a total set of 256 beams, then perform global coarse scanning for seven wide beams, and perform neighborhood tracking for seven narrow beams, to select a globally optimal high frequency beam. In this case, 15×7 times of scanning are required in the phase P1, 10 times of scanning are required in the phase P2, and 7 times of scanning are required in the phase P3.

It can be learned from the foregoing descriptions that three processing processes, that is, the phases P1 to P3, need to be performed during existing beam selection. Using beam search and reference signal feedback in each phase requires extremely high signaling overheads, a high delay, and high power consumption.

SUMMARY

Embodiments of this application provide a beam selection method and an apparatus, to resolve problems of high signaling overheads and a relatively long scanning process time in an existing beam scanning manner.

To achieve the foregoing objective, the following technical solutions are used in the embodiments of this application.

According to a first aspect, an embodiment of this application provides a beam selection method, and the method may include: A terminal determines a first angular power spectrum of a low frequency channel transmitted between the terminal and an access network device, determines a first high frequency beam scanning range based on the first angular power spectrum, and scans the first high frequency beam scanning range for a high frequency beam sent by the access network device.

Based on the method according to the first aspect, when scanning the high frequency beam delivered by the access network device, the terminal may determine the first high frequency beam scanning range based on the angular power spectrum of the low frequency channel transmitted between the terminal and the access network device, and scan, in the determined first high frequency beam scanning range, the high frequency beam sent by the access network device. In this way, the terminal may scan the high frequency beam in a specific range, and does not need to scan the high frequency beam in a large range (for example, an omnidirectional range) in three phases P1 to P3 as in the conventional technology. Compared with the conventional technology, the method in the first aspect reduces a scanning time, and in addition, a quantity of scanning times is reduced, and signaling interaction with the access network device does not need to be performed for a plurality of times, thereby reducing signaling overheads.

With reference to the first aspect, in a first embodiment of the first aspect, that the terminal determines a first high frequency beam scanning range based on the first angular power spectrum includes: The terminal calculates a peak-to-average ratio of the low frequency channel based on the first angular power spectrum, determines, based on the peak-to-average ratio of the low frequency channel and a correspondence between the peak-to-average ratio and a high frequency beam region range, a first region range corresponding to the peak-to-average ratio of the low frequency channel, and determines the first high frequency beam scanning range based on the first region range and an angle of a low frequency channel whose peak value is a first threshold.

Based on the first embodiment of the first aspect, the terminal may determine the first high frequency beam scanning range based on the peak-to-average ratio of the low frequency channel, for example, determine the peak-to-average ratio of the low frequency channel based on the angular power spectrum, obtain, based on the peak-to-average ratio of the low frequency channel and the preset correspondence between the peak-to-average ratio and the high frequency beam region range, the first region range corresponding to the peak-to-average ratio of the low frequency channel, and determine the first high frequency beam scanning range based on the first region range and the angle of the low frequency channel whose peak value is the first threshold. This process is simple and easy.

With reference to the first aspect or the first embodiment of the first aspect, the first angular power spectrum is a direction of arrival DOA power spectrum or a direction of departure DOD power spectrum. In this way, when scanning for the high frequency beam sent by the access network device, the terminal may determine the first high frequency beam scanning range based on the DOA power spectrum that is of the low frequency channel and that is sent by the access network device to the terminal, and determine, in a case of channel reciprocity, the first high frequency beam scanning range based on the DOD power spectrum that is of the low frequency channel and that is sent by the terminal to the access network device. Determining manners are flexible and diverse.

With reference to the first aspect or any embodiment of the first aspect, in a third embodiment of the first aspect, before the terminal determines a first high frequency beam scanning range based on the first angular power spectrum, the method further includes: The terminal determines a rotation angle of the terminal; and the terminal corrects the first angle power spectrum based on the rotation angle of the terminal.

Based on the third embodiment of the first aspect, when the terminal rotates, the first angular power spectrum may be corrected in time based on the rotation angle of the terminal, and the first high frequency beam scanning range may be determined based on the corrected angular power spectrum, to ensure accuracy of the determined first high frequency beam scanning range.

With reference to the first aspect or any embodiment of the first aspect, in a fourth embodiment of the first aspect, after the terminal determines a first angular power spectrum, the method further includes: When the terminal moves, and a moving distance of the terminal is greater than a channel correlation distance, the terminal re-determines, after the terminal moves, an angular power spectrum of the low frequency channel transmitted between the terminal and the access network device, for example, determines a second angular power spectrum of the low frequency channel transmitted between the terminal and the access network device. The channel correlation distance is determined based on a channel scenario in which the terminal is currently located, and the channel scenario in which the terminal is currently located is determined based on the first angular power spectrum.

Based on the fourth embodiment of the first aspect, when the terminal moves, and a moving amplitude is relatively large, the angular power spectrum of the low frequency channel transmitted between the terminal and the access network device may be re-determined, to ensure that the determined angular power spectrum conforms to a channel characteristic of the low frequency channel between the terminal and the access network device after the terminal moves.

With reference to the fourth embodiment of the first aspect, in a fifth embodiment of the first aspect, the method further includes: The terminal determines, based on the second angular power spectrum, a second high frequency beam scanning range, and scans the second high frequency beam scanning range for the high frequency beam sent by the access network device.

Based on the fifth embodiment of the first aspect, when the terminal moves, the terminal may determine the second high frequency beam scanning range based on the re-determined second angular power spectrum, and scan the determined second high frequency beam scanning range for the high frequency beam sent by the access network device, so as to improve scanning accuracy.

With reference to the first aspect or any embodiment of the first aspect, in a sixth embodiment of the first aspect, that a terminal determines a first angular power spectrum of a low frequency channel transmitted between the terminal and an access network device includes: When a whitelist includes information about the access network device, the terminal determines the first angular power spectrum of the low frequency channel transmitted between the terminal and the access network device, where the whitelist includes the information about the access network device that supports beam scanning by using a channel characteristic of the low frequency channel.

Based on the sixth embodiment of the first aspect, the method in this embodiment of this application may be used to determine the first high frequency beam scanning range by using the channel characteristic of the low frequency channel only when the access network device supports the information about the access network device that performs beam scanning by using the channel characteristic of the low frequency channel. The terminal scans the determined first high frequency beam scanning range for the high frequency beam, so that the terminal does not need to attempt to scan the high frequency beam by using the conventional technology, thereby reducing complexity of scanning the high frequency beam by the terminal.

With reference to any one of the first aspect to the fifth embodiment of the first aspect, in a seventh embodiment of the first aspect, that a terminal determines a first angular power spectrum of a low frequency channel transmitted between the terminal and an access network device includes: When the terminal determines that information about the access network device is not included in a blacklist, the terminal determines the first angular power spectrum of the low frequency channel transmitted between the terminal and the access network device, where the blacklist includes the information about the access network device that does not support beam scanning by using a channel characteristic of the low frequency channel.

Based on the seventh embodiment of the first aspect, when the access network device is not included in the blacklist, the method in this embodiment of this application may be used to determine the first high frequency beam scanning range by using the channel characteristic of the low frequency channel, and scan the determined first high frequency beam scanning range for the high frequency beam. That is, when scanning the high frequency beam, the terminal preferentially uses the method described in this embodiment of this application. Further, if no high frequency beam is found by using the method in this embodiment of this application, the terminal attempts to scan for the high frequency beam by using the conventional technology, thereby reducing complexity of scanning the high frequency beam by the terminal.

With reference to the first aspect or any embodiment of the first aspect, in an eighth embodiment of the first aspect, the method further includes: The terminal selects a candidate beam based on the first angular power spectrum.

Based on the seventh embodiment of the first aspect, the terminal may select the candidate beam, so that when the high frequency beam is not successfully found in the determined first high frequency beam scanning range, the terminal attempts to scan, at a location of the candidate beam, the high frequency beam sent by the access network device.

According to a second aspect, this application provides a communications apparatus. The communications apparatus may be a terminal, a chip in the terminal, or a system-on-a-chip; or may be a functional module that is in the terminal and that is configured to implement the method according to any one of the first aspect or the possible designs of the first aspect. The communications apparatus may implement functions performed by the terminal in the first aspect or any embodiment of the first aspect, and the functions may be implemented by executing corresponding software by hardware. The hardware or the software includes one or more modules corresponding to the functions. For example, the communications apparatus may include a determining unit and a scanning unit.

The determining unit is configured to: determine a first angular power spectrum of a low frequency channel transmitted between the terminal and an access network device, and determine a first high frequency beam scanning range based on the first angular power spectrum.

The scanning unit is configured to scan the first high frequency beam scanning range for a high frequency beam sent by the access network device.

Based on the method according to the second aspect, when scanning the high frequency beam delivered by the access network device, the communications apparatus may determine the first high frequency beam scanning range based on the first angular power spectrum of the low frequency channel transmitted between the terminal and the access network device, and scan the first high frequency beam scanning range for the high frequency beam sent by the access network device. In this way, the high frequency beam may be scanned for in a specific range, and the high frequency beam does not need to be scanned for in a large range (for example, an omnidirectional range) by using three phases P1 to P3 as in the conventional technology. Compared with the conventional technology, the method in the second aspect reduces a scanning time, and in addition, a quantity of scanning times is reduced, and signaling interaction with the access network device does not need to be performed for a plurality of times, thereby reducing signaling overheads.

With reference to the second aspect, in a first embodiment of the second aspect, the determining unit is specifically configured to: calculate a peak-to-average ratio of the low frequency channel based on the first angular power spectrum; determine, based on the peak-to-average ratio of the low frequency channel and a correspondence between the peak-to-average ratio and a high frequency beam region range, a first region range corresponding to the peak-to-average ratio of the low frequency channel; and determine the first high frequency beam scanning range based on the first region range and an angle of a low frequency channel whose peak value is a first threshold.

Based on the first embodiment of the second aspect, the first high frequency beam scanning range may be determined based on the peak-to-average ratio of the low frequency channel, for example, the peak-to-average ratio of the low frequency channel may be determine based on the angular power spectrum, the first region range corresponding to the peak-to-average ratio of the low frequency channel may be obtained based on the peak-to-average ratio of the low frequency channel and the preset correspondence between the peak-to-average ratio and the high frequency beam region range, and the first high frequency beam scanning range is determined based on the first region range and the angle of the low frequency channel whose peak value is the first threshold. This process is simple and easy.

With reference to the second aspect or the first embodiment of the second aspect, the first angular power spectrum is a direction of arrival DOA power spectrum or a direction of departure DOD power spectrum. In this way, when scanning for the high frequency beam sent by the access network device, the terminal may determine the first high frequency beam scanning range based on the DOA power spectrum that is of the low frequency channel and that is sent by the access network device to the terminal, and in a case of channel reciprocity, determine the first high frequency beam scanning range based on the DOD power spectrum that is of the low frequency channel and that is sent by the terminal to the access network device. Determining manners are flexible and diverse.

With reference to the second aspect or any embodiment of the second aspect, in a third embodiment of the second aspect, the determining unit is further configured to: before the determining unit determines the first high frequency beam scanning range based on the first angular power spectrum, determine a rotation angle of the terminal, and correct the first angular power spectrum based on the rotation angle of the terminal.

Based on the third embodiment of the second aspect, when the terminal rotates, the first angular power spectrum may be corrected in time based on the rotation angle of the terminal, and the first high frequency beam scanning range may be determined based on the corrected angular power spectrum, so as to ensure accuracy of the determined first high frequency beam scanning range.

With reference to the second aspect or any embodiment of the second aspect, in a fourth embodiment of the second aspect, the determining unit is further configured to: after determining the first angular power spectrum, when the terminal moves, and a moving distance of the terminal is greater than a channel correlation distance, re-determine, after the terminal moves, an angular power spectrum of the low frequency channel transmitted between the terminal and the access network device, for example, determine a second angular power spectrum of the low frequency channel transmitted between the terminal and the access network device is determined. The channel correlation distance is determined based on a channel scenario in which the terminal is currently located, and the channel scenario in which the terminal is currently located is determined based on the first angular power spectrum.

Based on the fourth embodiment of the second aspect, when the terminal moves, and a moving amplitude is relatively large, the angular power spectrum of the low frequency channel transmitted between the terminal and the access network device may be re-determined, to ensure that the determined angular power spectrum conforms to a channel characteristic of the low frequency channel between the terminal and the access network device after the terminal moves.

With reference to the fourth embodiment of the second aspect, in a fifth embodiment of the second aspect, the determining unit is further configured to determine a second high frequency beam scanning range based on the second angular power spectrum; and the scanning unit is further configured to scan the second high frequency beam scanning range for the high frequency beam sent by the access network device.

Based on the fifth embodiment of the second aspect, when the terminal moves, the terminal may determine the second high frequency beam scanning range based on the re-determined second angular power spectrum, and scan the determined second high frequency beam scanning range for the high frequency beam sent by the access network device, so as to improve scanning accuracy.

With reference to the second aspect or any embodiment of the second aspect, in a sixth embodiment of the second aspect, the determining unit is specifically configured to: when a whitelist includes information about the access network device, determine the first angular power spectrum of the low frequency channel transmitted between the terminal and the access network device, where the whitelist includes the information about the access network device that supports beam scanning by using a channel characteristic of the low frequency channel.

Based on the sixth embodiment of the second aspect, the method in this embodiment of this application may be used to determine the first high frequency beam scanning range by using the channel characteristic of the low frequency channel only when the access network device supports the information about the access network device that performs beam scanning by using the channel characteristic of the low frequency channel. The terminal scans the determined first high frequency beam scanning range for the high frequency beam, so that the terminal does not need to attempt to scan the high frequency beam by using the conventional technology, thereby reducing complexity of scanning the high frequency beam by the terminal.

With reference to any one of the second aspect to the fifth embodiment of the second aspect, in a seventh embodiment of the second aspect, the determining unit is specifically configured to: when the terminal determines that information about the access network device is not included in a blacklist, determine the first angular power spectrum of the low frequency channel transmitted between the terminal and the access network device, where the blacklist includes the information about the access network device that does not support beam scanning by using a channel characteristic of the low frequency channel.

Based on the seventh embodiment of the second aspect, when the access network device is not included in the blacklist, the method in this embodiment of this application may be used to determine the first high frequency beam scanning range by using the channel characteristic of the low frequency channel, and scan the determined first high frequency beam scanning range for the high frequency beam. That is, when scanning the high frequency beam, the terminal preferentially uses the method described in this embodiment of this application. Further, if no high frequency beam is found by using the method in this embodiment of this application, the terminal attempts to scan for the high frequency beam by using the conventional technology, thereby reducing complexity of scanning the high frequency beam by the terminal.

With reference to the second aspect or any embodiment of the second aspect, in an eighth embodiment of the second aspect, the communications apparatus further includes: a selection unit, configured to select a candidate beam based on the first angular power spectrum.

Based on the seventh embodiment of the second aspect, the terminal may select the candidate beam, so that when the high frequency beam is not successfully found in the determined first high frequency beam scanning range, the terminal attempts to scan a location of the candidate beam for the high frequency beam sent by the access network device.

According to a third aspect, a communications apparatus is provided. The communications apparatus may be a terminal, a chip in the terminal, or a system-on-a-chip. The communications apparatus may implement functions performed by the terminal in any one of the first aspect or the embodiments of the first aspect, and the functions may be implemented by hardware. For example, in a possible design, the communications apparatus may include a processor and a communications interface.

The processor is configured to: determine a first angular power spectrum of a low frequency channel transmitted between the terminal and an access network device, and determine a first high frequency beam scanning range based on the first angular power spectrum; and scan the first high frequency beam scanning range for a high frequency beam sent by the access network device.

For a specific implementation of the communications apparatus, refer to behavior and functions of the terminal in the beam selection method according to any one of the first aspect or the possible designs of the first aspect. Details are not repeated herein again. Therefore, the provided communications apparatus can achieve same beneficial effects as any one of the first aspect or the possible designs of the first aspect.

In still another possible design, in the third aspect, the communications apparatus may further include a memory. The memory is configured to store computer-executable instructions and data that are necessary for the communications apparatus. When the communications apparatus runs, the processor executes the computer-executable instructions stored in the memory, so that the communications apparatus performs the beam selection method according to any one of the first aspect or the possible designs of the first aspect.

According to a fourth aspect, a computer-readable storage medium is provided. The computer-readable storage medium may be a readable non-volatile storage medium. The computer-readable storage medium stores instructions. When the instructions are run on a computer, the computer is enabled to perform the beam selection method according to any one of the first aspect or the possible designs of the foregoing aspects.

According to a fifth aspect, a computer program product including instructions is provided. When the computer program product runs on a computer, the computer is enabled to perform the beam selection method according to any one of the first aspect or the possible designs of the foregoing aspects.

According to a sixth aspect, a communications apparatus is provided. The communications apparatus may be a terminal, a chip in the terminal, or a system-on-a-chip. The communications apparatus includes one or more processors and one or more memories. The one or more memories are coupled to the one or more processors, and the one or more memories are configured to store computer program code. The computer program code includes computer instructions, and when the one or more processors execute the computer instructions, the communications apparatus is enabled to perform the beam selection method according to any one of the first aspect or the possible designs of the first aspect.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides a beam selection method system. The system may include the terminal and the access network device according to any one of the second aspect to the sixth aspect.

DESCRIPTION OF EMBODIMENTS

Figure 1A:
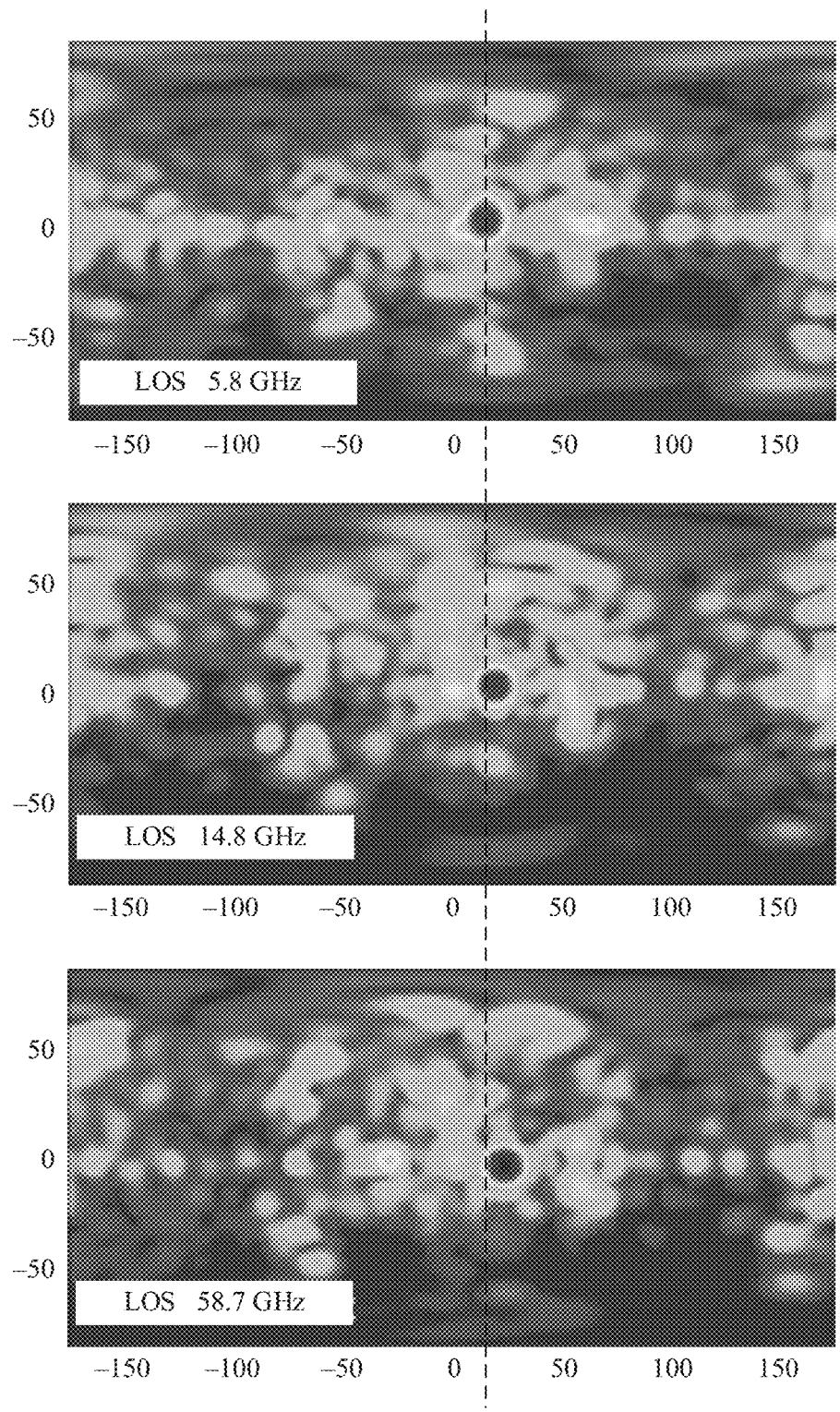
FIG. 1a is angular power spectra of different frequency bands in a LOS scenario.

A principle of the embodiments of this application is as follows: A low frequency channel and a high frequency beam have similar channel characteristics in a specific angle range (for example, angles, energy, delays, Doppler, and polarization modes are basically the same). A relatively small range of a high frequency beam scanning range is determined by using the channel characteristic of the low frequency channel, and the determined high frequency beam scanning range is scanned for the high frequency beam. In the conventional technology, similar to processes P1 to P3, a wide beam is first scanned for in a large range, and then a narrow beam that meets a requirement is finally determined by performing a plurality of times of scanning based on the wide beam, while in the embodiments of this application, a relatively small high frequency beam scanning range is directly determined based on a channel characteristic of the low frequency channel, and the high frequency beam is scanned for in a relatively small angle range. In this way, a scanning time and signaling overheads of the high frequency beam can be reduced.

For example, in the conventional technology, when the terminal uses the wide beam, the terminal may scan for a high frequency beam of an access network device by performing level-by-level beam width adjustment. For example, the terminal first attempts to scan for, in a 60-degree direction, the high frequency beam sent by the access network device. If the terminal cannot find the high frequency beam, the terminal attempts to scan for, in a 50-degree direction, the high frequency beam sent by the access network device. If the terminal still cannot find the high frequency beam, the terminal continues to attempt to scan for, in a 40-degree direction, the high frequency beam sent by the access network device until the high frequency beam is found. This process requires a longer time of beam selection and pairing. However, when performing beam scanning according to the foregoing principle, the terminal may first determine a specific range of a high frequency beam scanning range based on the channel characteristic of the low frequency channel, and scan the determined high frequency beam scanning range for the high frequency beam, without making a plurality of blind attempts, and taking a longer time.

Definitions of the high frequency beam and the low frequency channel in the embodiments of this application are as follows:

The high frequency beam may be a reference signal in a high frequency range and in a specific direction. The high frequency range may be a frequency range above 6 gigahertzes (GHz), for example, may be a frequency range 2 (frequency range 2, FR2) specified in the 3rd generation partnership project 3GPP protocol release (release) 15.

The low frequency channel may be a transmission channel in a low frequency range, for example, may be a carrier in the low frequency range, or may be a BWP and another frequency domain resource in the low frequency range. The low frequency range may be a frequency range below or equal to 6 GHz, for example, may be a frequency range 1 (frequency range 1, FR1) specified in the 3GPP release 15. It should be noted that the high frequency beam and the low frequency channel are relative concepts, and a frequency band of the high frequency beam may be greater than the low frequency channel. In the embodiments of this application, a carrier in a frequency range greater than 6 GHz is referred to as a high frequency beam, and a carrier in a frequency range less than or equal to 6 GHz is referred to as a low frequency channel. Alternatively, a carrier greater than a preset frequency band may be referred to as a high frequency beam, and a carrier less than or equal to the preset frequency band may be referred to as a low frequency channel. The preset frequency band may be set based on a requirement. This is not limited herein.

For example, FIG. 1a is angular power spectra of different frequency bands in a line of sight (line of sight, LOS) scenario, where a horizontal axis represents a direction of a channel or a beam transmitted between a terminal and an access network device, and a vertical axis represents normalized signal strength, that is, signal strength of each multipath is divided by strongest power. As shown in FIG. 1a, when a low frequency is 5.8 GHz, energy is concentrated in a 15-degree direction, and when a high frequency is 14.8 GHz and a high frequency is 58.7 GHz, capability is also concentrated in a direction about 15 degrees. It can be learned from FIG. 1a that, in the LOS scenario, a capability concentration angle of a low frequency channel is roughly the same as that of a high frequency beam, and a direction of a high frequency beam is basically the same as that of a low frequency channel.

Figure 1B:
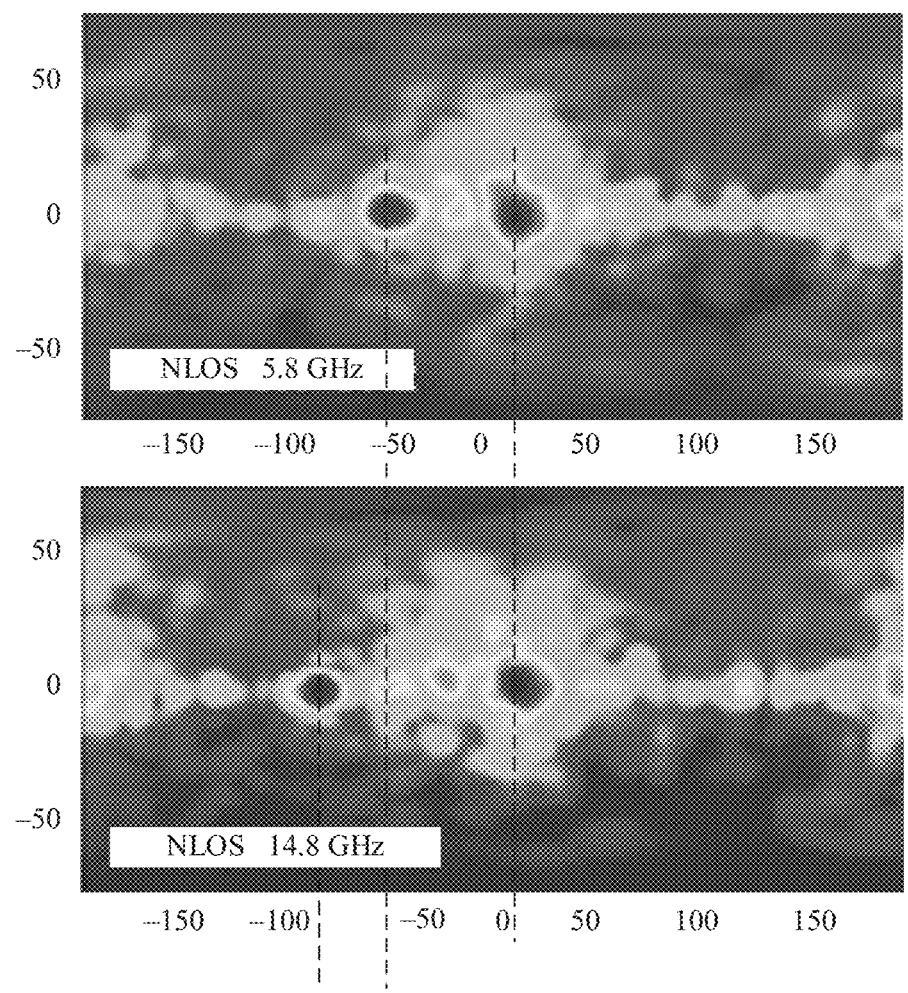
FIG. 1b is angular power spectra of different frequency bands in an NLOS scenario.

FIG. 1b is angular power spectra of different frequency bands in a non-line of sight (non-line of sight, NLOS) scenario. A horizontal axis represents a direction of a channel or a beam transmitted between a terminal and an access network device, and a vertical axis represents normalized signal quality. As shown in FIG. 1b, when a low frequency is 5.8 GHz, energy of a low frequency channel in a 15-degree direction is the largest, and energy of a low frequency channel in a direction about −50 degrees is the second largest. When a high frequency is 14.8 GHz, energy in the 15-degree direction is also the largest, and energy of a high frequency beam in a direction about −80 degrees is the second largest. It can be learned from FIG. 1b that, if a high frequency beam with better signal quality is scanned for, the high frequency beam may be scanned for in a direction about 15 degrees and in a direction about −80 degrees.

It can be learned from FIG. 1a and FIG. 1b that an energy concentration direction of the low frequency channel is approximately the same as or differs from a capability concentration direction of the high frequency beam by a specific angle range. Therefore, a channel characteristic of the low frequency channel may be measured. A direction of the low frequency channel prevails, and the high frequency beam may be scanned for in a specific range centered in the direction.

According to research, in different communication scenarios, a peak to average ratio (peak to average ratio, PAR) of the low frequency channel is different, and a high frequency beam scanning range is determined by using the channel characteristic of the low frequency channel. Accuracy of a high frequency beam obtained by scanning the determined high frequency beam scanning range may be different from an actually sent high frequency beam. A larger PAR indicates higher accuracy between the high frequency beam obtained by scanning the high frequency beam scanning range determined by using the channel characteristic of the low frequency channel and the actually sent high frequency beam. A smaller PAR indicates lower accuracy between the high frequency beam obtained by scanning the high frequency beam scanning range determined by using the channel characteristic of the low frequency channel and the actually sent high frequency beam.

Figure 1C:
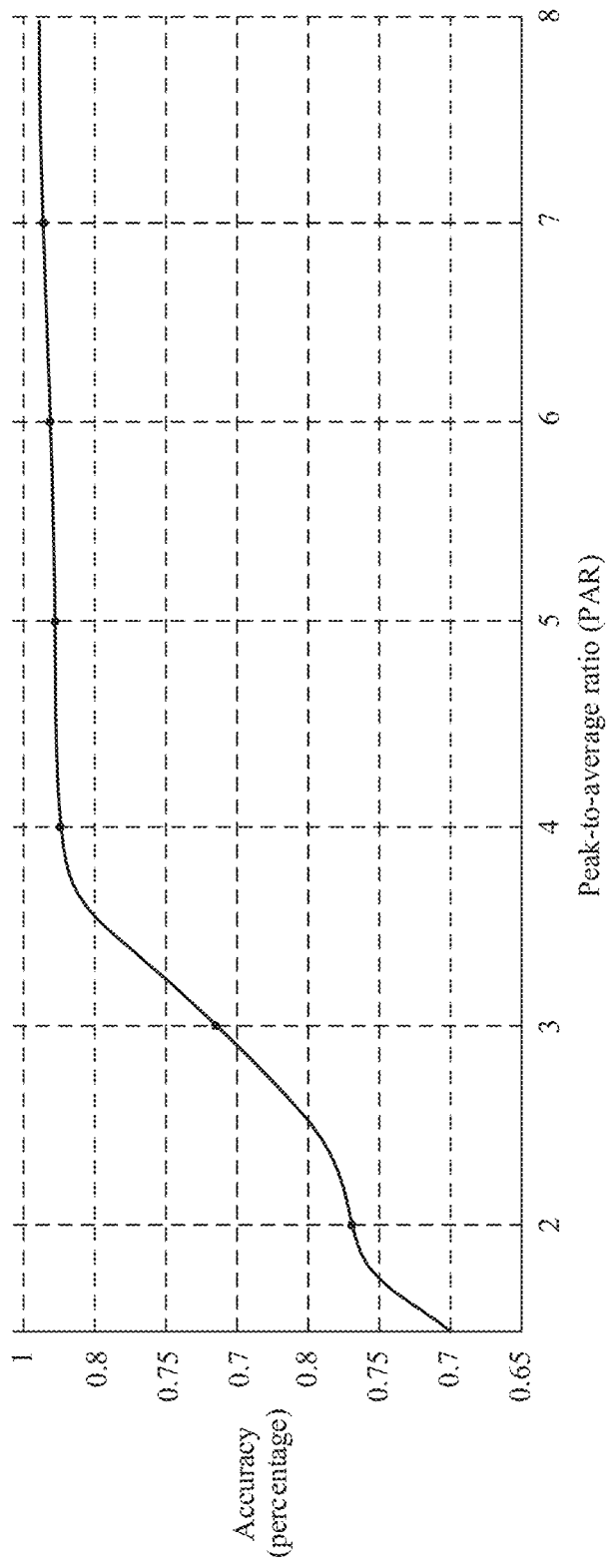
FIG. 1c is a simulation result of estimating a channel characteristic of a high frequency channel by using a low frequency channel.

For example, FIG. 1c is a simulation result of estimating a channel characteristic of a high frequency channel by using a low frequency channel. A horizontal axis represents a ratio of a strongest multipath to an average value in an angular power spectrum. A vertical axis represents accuracy of estimating an angle of the high frequency channel by using the low frequency channel. As shown in FIG. 1c, when the PAR is greater than or equal to 4, accuracy between a high frequency beam obtained by scanning a high frequency beam scanning range determined by using a channel characteristic of the low frequency channel and an actually sent high frequency beam may reach 98%, which is relatively high. However, when the PAR is 2, the accuracy between the high frequency beam obtained by scanning the high frequency beam scanning range determined by using the channel characteristic of the low frequency channel and the actually sent high frequency beam is only about 77%, which is relatively low. In view of this, to improve the accuracy between the high frequency beam obtained by scanning the high frequency beam scanning range determined by using the channel characteristic of the low frequency channel and the actually sent high frequency beam, different high frequency beam scanning ranges need to be determined based on different PARs of the low frequency channel.

The following describes, according to the foregoing principle, the beam selection method provided in the embodiments of this application.

The beam selection method provided in the embodiments of this application may be applicable to a communications system supporting high frequency communication and low frequency communication. For example, the communications system may be a cellular communications system, may be a long term evolution (long term evolution, LTE) system, or may be a fifth generation (5th generation, 5G) mobile communications system, or may be a new radio (new radio, NG) system, or may be another mobile communications system. This is not limited. The following uses only a communications system shown in FIG. 2 as an example to describe the method provided in the embodiments of this application.

Figure 2:
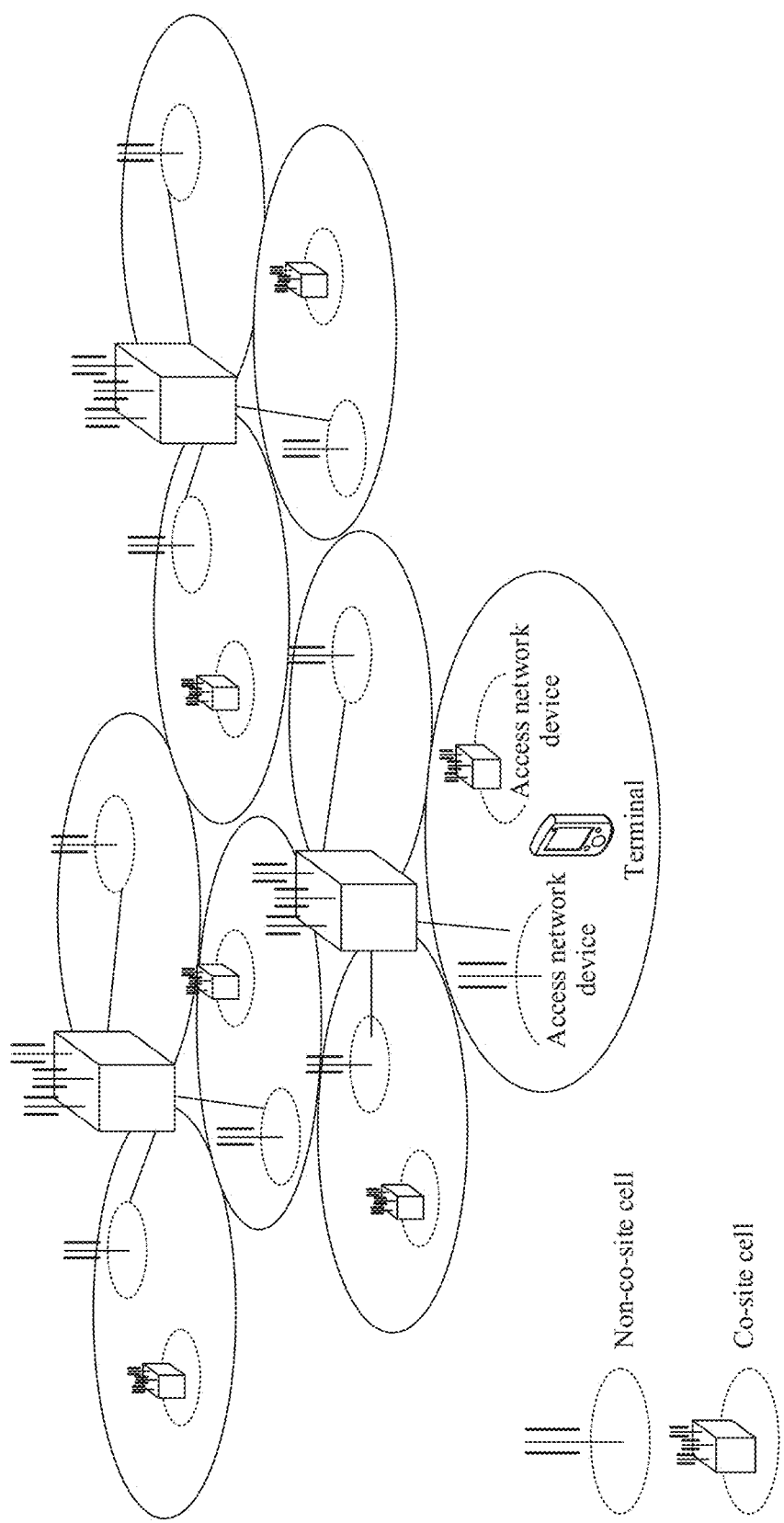
FIG. 2 is a schematic diagram of a communications system according to an embodiment of this application.

FIG. 2 is a schematic architectural diagram of the communications system according to an embodiment of this application. As shown in FIG. 2, the communications system includes an access network device and a plurality of terminals. The terminal may communicate with the access network device by using a high frequency beam, or may communicate with the access network device by using a low frequency channel, or may communicate with the access network device in a low frequency channel and a high frequency beam coordination manner. In a scenario in which the terminal communicates with the access network device by using the high frequency beam, the terminal and the access network device may form a plurality of beam pairs between the terminal and the access network device by using a beamforming technology, and send and receive data on the beam pairs. In this embodiment of this application, the terminal may determine, based on a channel characteristic of the low frequency channel, a high frequency beam scanning range used to scan for a high frequency beam, and scan the high frequency beam scanning range for the high frequency beam sent by the access network device. Specifically, for an implementation process, refer to the description in an embodiment corresponding to FIG. 4.

The terminal in FIG. 2 has a plurality of low frequency omnidirectional antenna arrays and a plurality of high frequency antenna arrays, and may perform low frequency communication with the access network device, or may perform high frequency communication with the access network device. The terminal in FIG. 2 may be referred to as a terminal device (terminal device), user equipment (user equipment, UE), a mobile station (mobile station, MS), a mobile terminal (mobile terminal, MT), or the like, and may be deployed on water (for example, on a ship); or may be deployed in the air (for example, on a plane, a balloon, or a satellite). Specifically, the terminal in FIG. 2 may be a mobile phone (mobile phone), a tablet computer, or a computer having a wireless transceiver function. Alternatively, the terminal may be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In the embodiments of this application, an apparatus for implementing a function of the terminal may be a terminal, or may be an apparatus that can support the terminal in implementing the function, for example, a chip system. In technical solutions provided in the embodiments of this application, an example in which an apparatus for implementing a terminal function is a terminal is used to describe the technical solutions provided in the embodiments of this application.

The access network device in FIG. 2 may be referred to as an access network, and is mainly configured to implement functions such as a radio physical control function, resource scheduling and radio resource management, radio access control, and mobility management. The access network device may perform low frequency communication with the terminal, or may perform high frequency communication with the terminal. Specifically, the access network device may be an access network (access network, AN) device/a radio access network (radio access network, RAN) device, may be a device including a plurality of 5G-AN/5G-RAN nodes, or may be any node of a nodeB (nodeB, NB), an evolved nodeB (evolution nodeB, eNB), a next generation nodeB (generation NodeB, gNB), a transmission reception point (transmission reception point, TRP), a transmission point (transmission point, TP), or another access node. In this embodiment of this application, an apparatus configured to implement a function of the access network device may be an access network device, or may be an apparatus, for example, a chip system, that can support the access network device in implementing the function. This is not limited.

For example, the access network device is a base station. The base station in FIG. 2 may be a device in which a low frequency and a high frequency are co-sited. For example, the base station may be a device in which an NR high frequency and LTE are co-sited, or may be a device in which an NR low frequency and an NR high frequency are co-sited, or a device in which an NR high frequency and wireless emulation (wireless fidelity, WI-FI) are co-sited, or the like. Alternatively, the base station in FIG. 2 may alternatively be non-co-sited. This is not limited.

It should be noted that FIG. 2 is merely a figure as an example. A quantity of devices included in FIG. 2 is not limited. In addition to the devices shown in FIG. 2, the communications architecture may further include another device, for example, may further include a core network device or a data network. In addition, a name of each device in FIG. 2 is not limited. In addition to names shown in FIG. 2, each device may be named another name. This is not limited.

Figure 3:
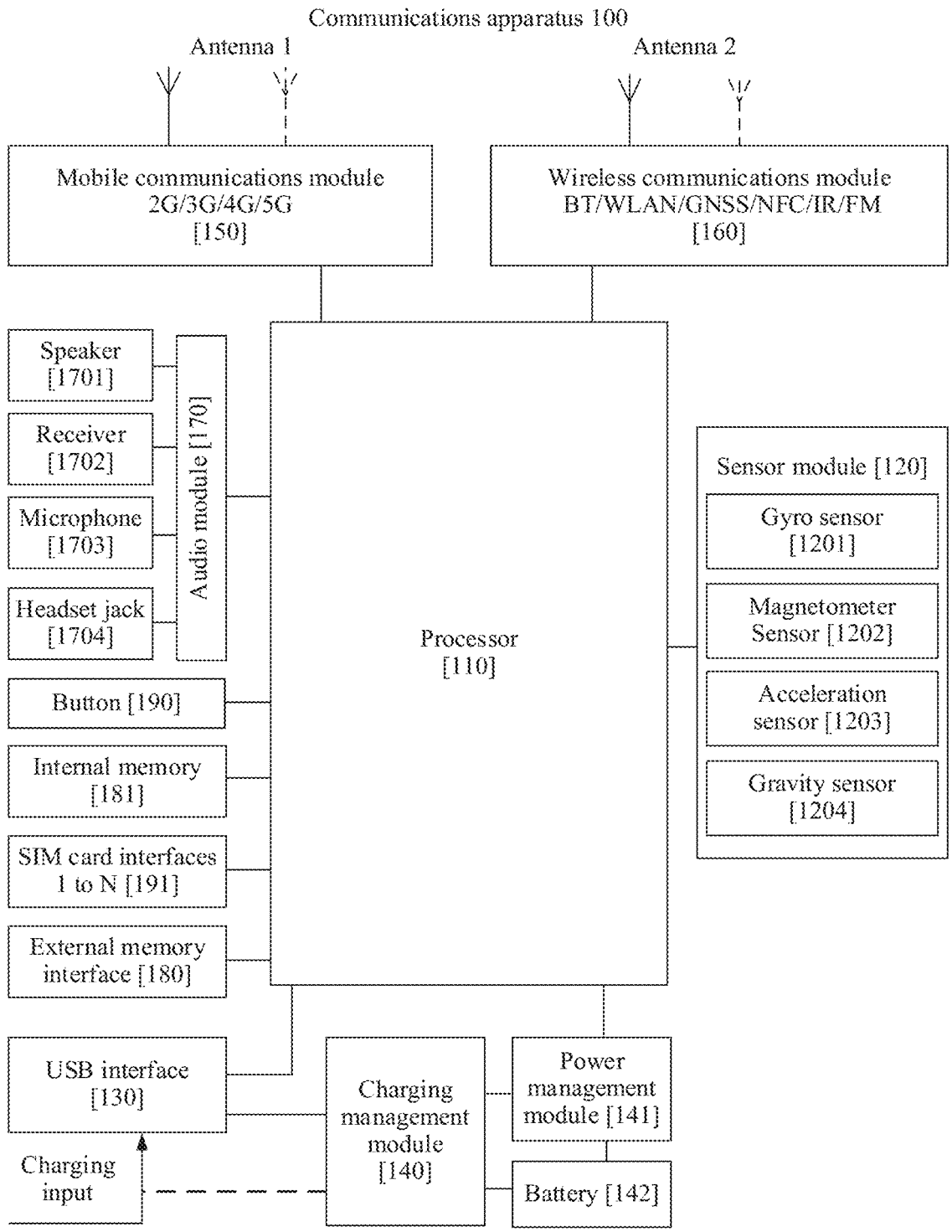
FIG. 3 is a schematic composition diagram of a communications apparatus according to an embodiment of this application.

During specific implementation, the terminal shown in FIG. 2 has components shown in FIG. 3. FIG. 3 is a schematic composition diagram of a communications apparatus 100 according to an embodiment of this application. The communications apparatus may be a terminal, a chip in the terminal, or a system-on-a-chip. As shown in FIG. 3, the communications apparatus 100 includes a processor 110, a sensor module 120, an antenna 1, an antenna 2, a universal serial bus (universal serial bus, USB) interface 130, a charging management module 140, a power management module 141, a battery 142, a mobile communications module 150, a wireless communications module 160, an audio module 170, a speaker 1701, a receiver 1702, a microphone 1703, a headset jack 1704, an external memory interface 180, an internal memory 181, a button 190, a subscriber identity module (subscriber identity module, SIM) card interface 191, and the like. The sensor module 120 may include a gyro sensor 1201, a magnetometer sensor 1202, an acceleration sensor 1203, a gravity sensor 1204, and the like.

The processor 110 in FIG. 3 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a high-speed cache memory. The memory may store instructions or data just used or cyclically used by the processor 110. If the processor 110 needs to use the instructions or the data again, the processor 110 may directly invoke the instructions or data from the memory, thereby avoiding repeated access, reducing a waiting time of the processor 110, and improving system efficiency.

In some embodiments, the processor 110 may include one or more interfaces, for example, may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a USB interface 130, or the like.

The gyro sensor 1201 may be configured to determine a motion posture of the communications apparatus 100. In some embodiments, an angular velocity of the communications apparatus 100 around three axes (namely, axes x, y, and z) may be determined by using the gyro sensor 1201. The gyro sensor 1201 may be configured to perform image stabilization during photographing. For example, when the shutter is pressed, the gyro sensor 1201 detects an angle at which the communications apparatus 100 shakes, and calculates, based on the angle, a distance for which a lens module needs to compensate, so that the lens cancels the shake of the communications apparatus 100 through reverse motion, to implement image stabilization. The gyro sensor 1201 may be further used in navigation and motion sensing game scenarios.

The magnetometer sensor 1202 includes a Hall sensor. The communications apparatus 100 may detect opening and closing of a flip leather case by using the magnetometer sensor 1202. In some embodiments, when the communications apparatus 100 is a clamshell phone, the communications apparatus 100 may detect opening and closing of a flip cover by using the magnetometer sensor 180D. Further, a feature such as automatic unlocking upon opening of the flip cover is set based on a detected opening or closing state of the leather case or a detected opening or closing state of the flip cover.

The acceleration sensor 1203 may detect a magnitude of an acceleration of the communications apparatus 100 in each direction (usually, three axes). When the communications apparatus 100 is static, a magnitude and a direction of gravity may be detected. The acceleration sensor 1203 may be further configured to identify a posture of the electronic device, and is used in an application such as switching between landscape mode and portrait mode or a pedometer.

The gravity sensor 1204 uses an elastic sensitive element to make a cantilever-type displacement device, and an energy storage spring made of the elastic sensitive element to drive an electrical contact to complete conversion from gravity to an electrical signal. The gravity sensor measures an acceleration caused by gravity and calculates a tilt angle of a device relative to a horizontal plane. For example, a mobile phone with a gravity sensor can sense a screen status and automatically adjust the screen to keep level.

The charging management module 140 is configured to receive a charging input from a charger. The charger may be a wireless charger or a wired charger. In some embodiments of wired charging, the charging management module 140 may receive charging input from the wired charger through the USB interface 130. In some embodiments of wireless charging, the charging management module 140 may receive a wireless charging input by using a wireless charging coil of the communications apparatus 100. The charging management module 140 may further supply power to the electronic device by using the power management module 141 while charging the battery 142.

The power management module 141 is configured to connect to the battery 142, the charging management module 140, and the processor 110. The power management module 141 receives input from the battery 142 and/or the charging management module 140, and supplies power to each component of the communications apparatus 100. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the communications apparatus 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the communications apparatus 100 may be configured to cover one or more communication bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the communications apparatus 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The low frequency baseband signal is processed by the baseband processor, and then transmitted to the application processor. The application processor outputs a sound signal by using an audio device (not limited to the speaker 1701, the receiver 1702, and the like). In some embodiments, the modem processor may be an independent component. In some other embodiments, the modem processor may be independent of the processor 110, and disposed in a same device with the mobile communications module 150 or another functional module.

The wireless communications module 160 may provide a solution for wireless communication such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology applied to the communications apparatus 100. The wireless communications module 160 may be one or more devices that integrate at least one communication processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the communications apparatus 100 is coupled to the mobile communications module 150, and the antenna 2 is coupled to the wireless communications module 160, so that the communications apparatus 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The external memory interface 180 may be configured to connect to an external storage card, for example, a micro SD card, to extend a storage capability of the communications apparatus 100. The external storage card communicates with the processor 110 through the external memory interface 180, to implement a data storage function. For example, files such as music and a video are stored in the external storage card.

The internal memory 181 may be configured to store computer-executable program code. The executable program code includes instructions. The processor 110 runs the instructions stored in the internal memory 181 to perform various function applications of the communications apparatus 100 and process data. The internal memory 181 may include a program storage area and a data storage area. The program storage area may store an operating system, an application required by at least one function (such as a sound playing function or an image playing function), and the like. The data storage area may store data (such as audio data and an address book) created during use of the communications apparatus 100, and the like. In addition, the internal memory 181 may include a high-speed random access memory, and may further include a nonvolatile memory, for example, at least one magnetic disk storage device, a flash memory device, or a universal flash storage (universal flash storage, UFS).

The communications apparatus 100 may implement an audio function, for example, music playing and recording, by using the audio module 170, the speaker 1701, the receiver 1702, the microphone 1703, the headset jack 1704, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 1701, also referred to as a "horn", is configured to convert an audio electrical signal into a sound signal. The communications apparatus 100 may be configured to listen to music or answer a hands-free call by using the speaker 170A.

The receiver 1702, also referred to as an "earpiece", is configured to convert an audio electrical signal into a sound signal. When the communications apparatus 100 is configured to answer a call or listen to voice information, the receiver 170B may be placed close to a human ear to listen to a voice.

The microphone 1703, also referred to as a "mike" or a "microphone", is configured to convert a sound signal into an electrical signal. When making a call, sending voice information, or needing to trigger, by using a voice assistant, the communications apparatus 100 to perform some functions, a user may make a sound near the microphone 1703 by using a human mouth, and input a sound signal to the microphone 1703. At least one microphone 1703 may be disposed in the communications apparatus 100. In some other embodiments, two microphones 1703 may be disposed in the communications apparatus 100, to implement a noise reduction function, in addition to collecting a sound signal. In some other embodiments, three, four, or more microphones 1703 may be alternatively disposed in the communications apparatus 100, to collect a sound signal and reduce noise. The microphones may further identify a sound source, implement a directional recording function, and the like.

The headset jack 1704 is configured to connect to a wired headset. The headset jack 1704 may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The button 190 includes a power button, a volume button, and the like. The button 190 may be a mechanical button, or may be a touch button. The communications apparatus 100 may receive button input, and generate button signal input related to user setting and function control of the communications apparatus 100.

The SIM card interface 191 is configured to connect to a SIM card. The SIM card may be inserted into the SIM card interface 191 or removed from the SIM card interface 191, to implement contact and separation from the communications apparatus 100. The communications apparatus 100 may support one or N SIM card interfaces, and N is a positive integer greater than 1. The SIM card interface 191 may support a nano SIM card, a micro SIM card, a SIM card, and the like. A plurality of cards may be simultaneously inserted into a same SIM card interface 191. The plurality of cards may be of a same type or of different types. The SIM card interface 191 may also be compatible with different types of SIM cards. The SIM card interface 191 may also be compatible with an external storage card. The communications apparatus 100 interacts with a network by using the SIM card, to implement functions such as calling and data communication. In some embodiments, the communications apparatus 100 uses an eSIM, namely, an embedded SIM card. The eSIM card may be embedded in the communications apparatus 100, and cannot be separated from the communications apparatus 100.

It may be understood that the software system of the communications apparatus 100 may use a layered architecture, an event-driven architecture, a microkernel architecture, a micro service architecture, or a cloud architecture. In this embodiment, an Android system with a layered architecture is used as an example to describe a software structure of the communications apparatus 100. In addition, the structure shown in this embodiment does not constitute a specific limitation on the communications apparatus 100. In some other embodiments, the communications apparatus 100 may include more or fewer components than those shown in the figure, or some components may be combined, or some components may be split, or there may be a different component layout. The components shown in FIG. 3 may be implemented by using hardware, software, or a combination of software and hardware.

The following describes, according to the foregoing principle and with reference to the system shown in FIG. 2, a beam selection method provided in the embodiments of this application. Each device in the following method embodiment may have components shown in FIG. 3. Details are not described again. In addition, in the following embodiments of this application, names of messages between network elements, names of parameters in messages, or the like are merely examples, and there may be other names during specific implementation. This is not specifically limited in the embodiments of this application.

Figure 4:
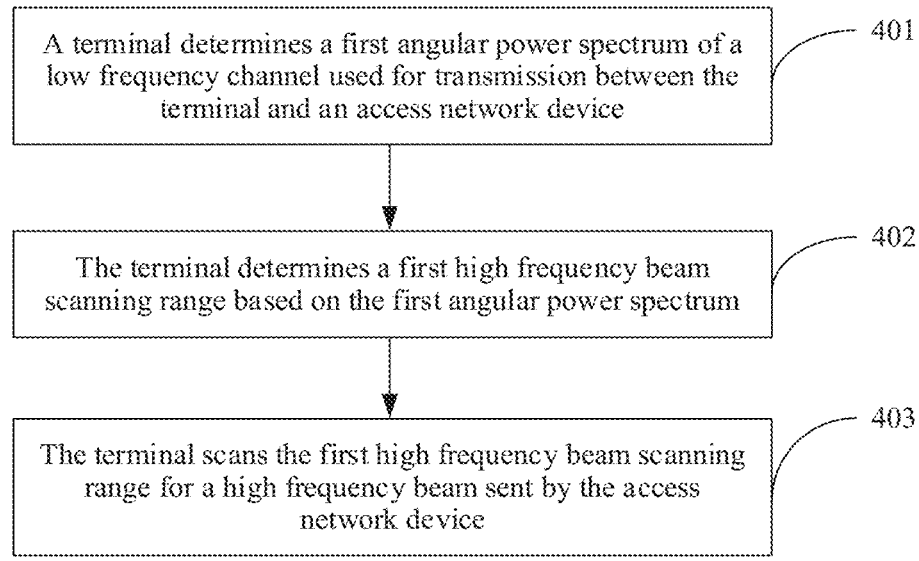
FIG. 4 is a flowchart of a beam selection method according to an embodiment of this application.

FIG. 4 is a beam selection method according to an embodiment of this application. As shown in FIG. 4, the method may include the following steps.

Step 401: A terminal determines a first angular power spectrum of a low frequency channel transmitted between the terminal and an access network device.

The access network device may be the access network device in FIG. 2, and the terminal may be any terminal in FIG. 2. The access network device and the terminal may transmit the low frequency channel, or may transmit a high frequency beam.

The low frequency channel transmitted between the terminal and the access network device may be a low frequency channel (or referred to as a downlink low frequency channel) sent by the access network device to the terminal. At a same moment, the access network device may send a plurality of low frequency channels to the terminal at a same moment. Alternatively, when there is reciprocity between a channel sent by the terminal to the access network device and a channel sent by the access network device to the terminal, a transmission channel between the terminal and the access network device may alternatively be a low frequency channel (or referred to as an uplink low frequency channel) sent by the terminal to the access network device. In this way, a high frequency beam (or referred to as a downlink high frequency beam) sent by the access network device to the terminal may be determined by using a channel characteristic of the uplink low frequency channel. At a same moment, the terminal may send a plurality of low frequency channels to the access network device.

The first angular power spectrum may reflect a curve relationship between an angle of the low frequency channel and power of the low frequency channel, and the first angular power spectrum may include a direction of arrival (direction of arrival, DOA) power spectrum or a direction of departure (direction of departure, DOD) power spectrum.

For example, when the low frequency channel transmitted between the terminal and the access network device is the low frequency channel sent by the access network device to the terminal, the terminal may determine a DOA power spectrum of the low frequency channel. When the low frequency channel transmitted between the terminal and the access network device is the low frequency channel sent by the terminal to the access network device, the terminal may determine a DOD power spectrum of the low frequency channel.

The DOA power spectrum may reflect a curve relationship between an angle at which the low frequency channel arrives at the terminal and the power of the low frequency channel, and the DOD power spectrum may reflect a curve relationship between an angle at which the low frequency channel leaves the terminal and the power of the low frequency channel. The terminal may determine the DOA angular power spectrum or the DOD power spectrum by using the conventional technology. Details are not described. For a same low frequency channel, a DOA power spectrum determined by the terminal is the same as a DOD power spectrum determined by the terminal, and the DOA power spectrum and the DOD power spectrum may be collectively referred to as an angular power spectrum.

Step 402: The terminal determines a first high frequency beam scanning range based on the first angular power spectrum.

The first high frequency beam scanning range may be an angle range centered on the angle of a low frequency channel, and the terminal may scan for, in the angle range, the high frequency beam sent by the access network device. In this embodiment of this application, an angle of one low frequency channel may correspond to one high frequency beam scanning beam, and angles of a plurality of low frequency channels may correspond to a plurality of high frequency beam scanning ranges.

For example, the terminal may calculate a peak-to-average ratio of the low frequency channel based on the first angular power spectrum, and determine the first high frequency beam scanning range based on the peak-to-average ratio of the low frequency channel.

That the terminal calculates a peak-to-average ratio of the low frequency channel based on the first angular power spectrum may include: The terminal obtains a maximum peak value and an average value from the first angular power spectrum, and calculates a ratio of the maximum peak value to the average value to obtain the peak-to-average ratio of the low frequency channel. For example, when the first angular power spectrum is the DOA power spectrum, the terminal may obtain the maximum peak value and the average value from the DOA power spectrum, and calculate the ratio of the maximum peak value to the average value to obtain the peak-to-average ratio of the low frequency channel. When the first angular power spectrum is the DOD power spectrum, the terminal may obtain the maximum peak value and the average value from the DOD power spectrum, and calculate the ratio of the maximum peak value to the average value to obtain the peak-to-average ratio of the low frequency channel.

Figure 5A:
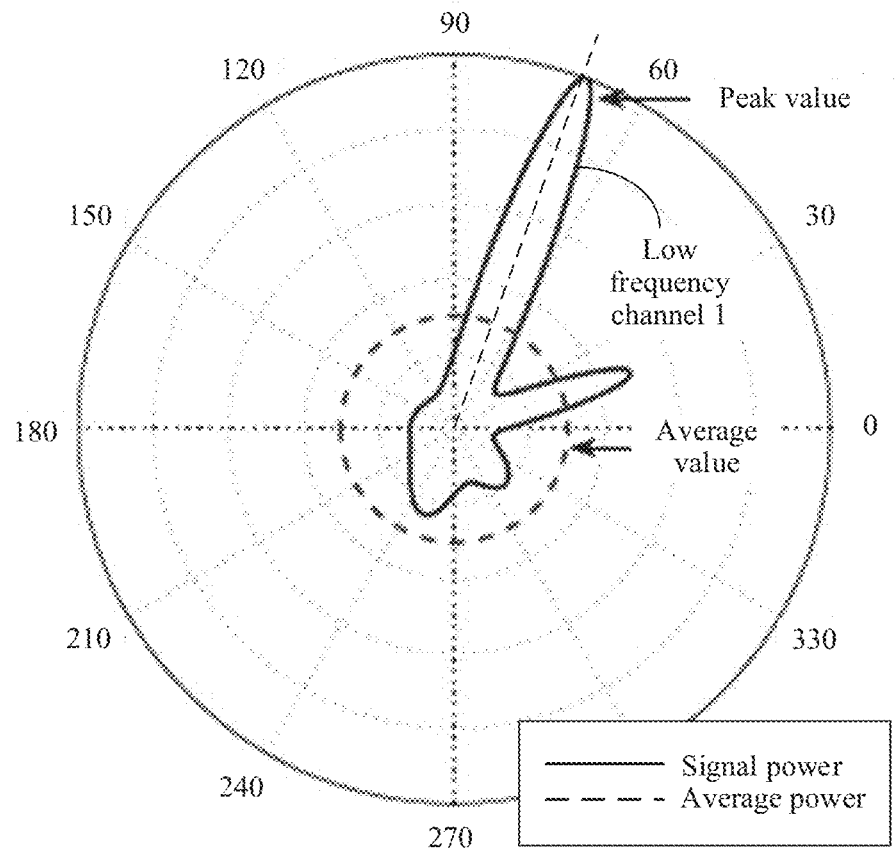
FIG. 5a is an angular power spectrum in a LOS and strong reflection scenario.
Figure 5B:
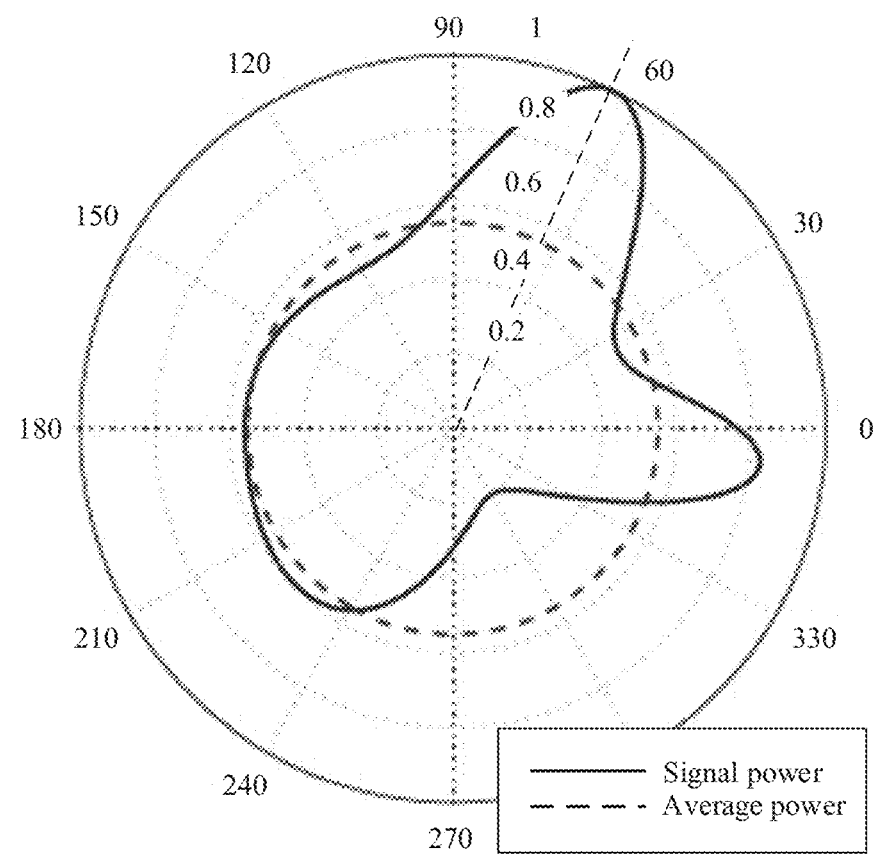
FIG. 5b is an angular power spectrum in a complex reflection, scattering, and occlusion scenario.

For example, FIG. 5*a* is an angular power spectrum of the low frequency channel in a LOS and strong reflection scenario. It can be learned from FIG. 5*a* that the average value is about 0.22, and the maximum peak value is 1. In this case, the peak-to-average ratio may be $1/0.22 \approx 4.5$. FIG. 5*b* is an angular power spectrum of a low frequency channel in a complex transmission, scattering, and occlusion scenario. It can be learned from FIG. 5*b* that the average value is about 0.5, and the maximum peak value is 1. In this case, the peak-to-average ratio may be $1/0.5=2$.

That the terminal determines a first high frequency beam scanning range based on the first angular power spectrum may include: The terminal determines, based on a correspondence between the peak-to-average ratio of the low frequency channel and a high frequency beam region range, a first region range corresponding to the peak-to-average ratio of the low frequency channel, and determines, based on the first high frequency beam region range and an angle of a low frequency channel whose peak value is a first threshold, the first high frequency beam scanning range, where a range size of the first high frequency beam scanning range is the same as a range size of the first region range, and a center angle of the first high frequency beam scanning range may be the angle of the low frequency channel whose peak value is the first threshold.

The first threshold may be set as required. Optionally, the low frequency channel whose peak value is the first threshold may be a low frequency channel with a maximum peak value in all low frequency channels, or may be one or more low frequency channels whose peak values are greater than or equal to a threshold. The threshold may be set as required.

It should be noted that, in the embodiments of this application, the angle of the low frequency channel may be a main path direction of the low frequency channel, and the main path direction of the low frequency channel may be a direction with maximum energy on the low frequency channel. For example, as shown in FIG. 5*a*, a main path direction of a low frequency channel 1 is approximately 70 degrees.

In this embodiment of this application, the correspondence between the peak-to-average ratio and the high frequency beam region range may be preset. A larger peak-to-average ratio indicates a better current communication environment, an energy concentration range of the low frequency channel is relatively close to the high frequency beam, and the high frequency beam region range corresponding to the peak-to-average ratio is smaller. In this case, the high frequency beam may be scanned for in an angle range close to the low frequency channel. A smaller peak-to-average ratio indicates a poorer current communication environment, an energy concentration range of the low frequency channel is relatively far away from the high frequency beam, and the high frequency beam region range corresponding to the peak-to-average ratio is approximately larger. In this case, the high frequency beam may be scanned for in an angle range far from the low frequency channel. For example, the following is the correspondence between the peak-to-average ratio and the high frequency beam region range:

when the peak-to-average ratio is greater than or equal to 4, the high frequency beam region range is from −5 degrees to +5 degrees;

when the peak-to-average ratio is less than 4 and is greater than or equal to 3, the high frequency beam region range is from −10 degrees to +10 degrees;

when the peak-to-average ratio is less than 3 and is greater than or equal to 2, the high frequency beam region range is from −20 degrees to +20 degrees;

when the peak-to-average ratio is less than 2 and is greater than or equal to 1, the high frequency beam region range is from −30 degrees to +30 degrees; and when the peak-to-average ratio is less than 1, the first high frequency beam scanning range may not need to be determined, and the high frequency beam sent by the access network device is scanned for in phases P1 to P3 by using the conventional technology.

For example, an angle of a low frequency channel with a maximum peak value in the first high frequency beam scanning range is used as a center. For example, as shown in FIG. 5a, the PAR is about 4.5, the PAR is greater than 4, and a corresponding scanning range is from −5 degrees to +5 degrees. It can be learned from FIG. 5a that the angle of the low frequency channel with the maximum peak is about 70 degrees. In this case, the terminal may determine that the first high frequency beam scanning range is from 65 degrees to 75 degrees centered on 70 degrees.

For another example, as shown in FIG. 5b, the PAR is about 2, the PAR is greater than 2 and less than 3, and a corresponding scanning range is a range from −20 degrees to +20 degrees. It can be learned from FIG. 5b that the angle of the low frequency channel with the maximum peak value is about 70 degrees. In this case, the terminal may determine that the first high frequency beam scanning range is from 50 degrees to 90 degrees centered on 70 degrees.

Step 403: The terminal scans the first high frequency beam scanning range for the high frequency beam sent by the access network device.

The access network device may send the high frequency beam to the terminal by using the conventional technology. For example, the access network device may send the high frequency beam to the terminal in a large range (in a plurality of directions). Alternatively, the access network device may send the high frequency beam to the terminal by using the following method.

The access network device determines an angular power spectrum of a low frequency channel transmitted between the access network device and the terminal, calculates, based on the angular power spectrum of the low frequency channel, a peak-to-average ratio of the low frequency channel transmitted between the terminal and the access network device, determines a high frequency beam sending range based on the peak-to-average ratio of the low frequency channel, and sends the high frequency beam to the terminal in the high frequency beam sending range. In this way, the high frequency beam may be sent to the terminal in a specific angle range, and the high frequency beam does not need to be sent in a large range as in the conventional technology, thereby reducing reference signal resources and network resources occupied for sending the high frequency beam.

When the low frequency channel transmitted between the terminal and the access network device is the low frequency channel sent by the access network device to the terminal, the access network device may determine the DOD power spectrum of the low frequency channel, obtain the maximum peak value and the average value from the DOD power spectrum, and calculate the ratio of the maximum peak value to the average value, to obtain the peak-to-average ratio. When the low frequency channel transmitted between the terminal and the access network device is the low frequency channel sent by the terminal to the access network device, the access network device may determine the direction of arrival DOA power spectrum of the low frequency channel, obtain the maximum peak value and the average value from the DOA power spectrum, and calculate the ratio of the maximum peak value to the average value, to obtain the peak-to-average ratio.

That the access network device determines a high frequency beam sending range based on the calculated peak-to-average ratio may include: A larger peak-to-average ratio indicates a better current communication environment, an energy concentration range of the low frequency channel is close to that of the high frequency beam, and the determined high frequency beam sending range is closer to the angle of the low frequency channel. For example, when the peak-to-average ratio is greater than or equal to 4, it is determined that the high frequency beam sending range is ±5 degrees of the angle of the low frequency channel whose peak value is the first threshold. When the peak-to-average ratio is less than 4 and is greater than or equal to 3, it is determined that the high frequency beam sending range is ±10 degrees of the angle of the low frequency channel whose peak value is the first threshold. When the peak-to-average ratio is less than 3 and is greater than or equal to 2, it is determined that the high frequency beam sending range is ±20 degrees of the angle of the low frequency channel whose peak value is the first threshold. When the peak-to-average ratio is less than 2 and is greater than or equal to 1, it is determined that the high frequency beam sending range is ±30 degrees of the angle of the low frequency channel whose peak value is the first threshold. When the peak-to-average ratio is less than 1, the high frequency beam sending range may not need to be determined, but the high frequency beam is sent to the terminal in a relatively large range by using the conventional technology.

That the terminal scans for the high frequency beam sent by the access network device may be: The terminal measures signal quality of the high frequency beam, for example, measures reference signal received power (reference signal received power, RSRP), reference signal received quality (reference signal received quality, RSRQ), a reference signal received strength indicator (received signal strength indicator, RSSI), a block error rate (block error rate, BLER), a signal to interference and noise ratio (signal to interference and noise ratio, SINR), a channel quality indicator (channel quality indicator, CQI) of the high frequency beam.

Based on the method shown in FIG. 4, when scanning for the high frequency beam delivered by the access network device, the terminal may determine the first high frequency beam scanning range based on the angular power spectrum of the low frequency channel, and scan the first high frequency beam scanning range for the high frequency beam sent by the access network device. In this way, the terminal may scan a specific range for the high frequency beam, and does not need to scan a large range for the high frequency beam by using three phases P1 to P3 as in the conventional technology. Compared with the conventional technology, the method provided in FIG. 4 reduces a scanning time. In addition, signaling interaction with the access network device does not need to be performed for a plurality of times, thereby reducing signaling overheads.

In a first embodiment of the method shown in FIG. 4, further, after the terminal completes scanning of the high frequency beam in the first high frequency beam scanning range, the terminal may indicate, to the access network device, information about a scanned high frequency beam with better signal quality, so that the access network device sends data to the terminal on a high frequency beam with optimal signal quality. The information about the high frequency beam may include any one or more types of the following information: an index number of the high frequency beam, an angle of the high frequency beam, information about a reference signal corresponding to the high frequency beam, information about a low frequency channel adjacent to the high frequency beam, and the like. This is not limited.

For example, as shown in FIG. 5a, the PAR is 4.5, and the PAR is greater than 4. It can be learned from FIG. 5a that a low frequency channel with a maximum peak value is located at about 70 degrees, and a low frequency channel with a second largest peak value is located at about 23 degrees. In this case, the terminal may scan for, in a range of 65 degrees to 75 degrees and in a range of 18 degrees to 28 degrees, the high frequency beam sent by the access network device. If signal quality of a high frequency beam found by the terminal in the range of 65 degrees to 75 degrees is 10 db, and signal quality of a high frequency beam found in the range of 18 degrees to 28 degrees is 3 db, the terminal may report related information about the high frequency beam in the range of 65 degrees to 75 degrees to the access network device, so that the access network device sends data in the range of 65 degrees to 75 degrees by using the high frequency beam.

It should be noted that, to prevent normal data transmission from being affected when the terminal fails to select a high frequency beam with better signal quality from the determined high frequency beam range, or when the terminal fails to receive data on a found high frequency beam, in the process shown in FIG. 4, the terminal may select one or more candidate beams based on the first angular power spectrum, so as to receive data on the selected candidate beam. Specifically, a process in which the terminal selects the candidate beam based on the first angular power spectrum is as follows:

When the peak-to-average ratio is greater than or equal to 4, the terminal selects one candidate beam, and an angle of the candidate beam is an angle of a low frequency channel whose energy is a second largest peak value. For example, as shown in FIG. 5a, if the terminal scans for no high frequency beam with optimal signal quality in the range of 65 degrees to 75 degrees, the terminal may use the high frequency beam in the range of 18 degrees to 28 degrees as the candidate beam.

When the peak-to-average ratio is less than 4 and is greater than or equal to 3, the terminal selects two candidate beams, where the two candidate beams correspond to two low frequency channels whose energy is a second largest peak value, and angles of the candidate beams are angles of the low frequency channels whose energy is the second largest peak value.

When the peak-to-average ratio is less than 3 and is greater than or equal to 2, the terminal selects three candidate beams, where the three candidate beams correspond to three low frequency channels whose energy is the second largest peak value, and angles of the candidate beams are angles of the low frequency channels that correspond to the three candidate beams and whose energy is the second largest peak value. When the peak-to-average ratio is less than 2 and is greater than or equal to 1, the terminal selects four candidate beams, where the four candidate beams correspond to four low frequency channels whose energy is greater than the second largest peak value, and angles of the candidate beams are angles of the low frequency channels that correspond to the candidate beams and whose energy is the second largest peak value.

In this way, when high frequency beam scanning fails or high frequency beam communication fails, high frequency communication may be performed by using the candidate beam, to ensure normal data transmission.

In a second embodiment of the method shown in FIG. 4, when the terminal performs step 401, the terminal may further determine whether the access network device is included in a whitelist. If the access network device is included in the whitelist, the terminal may perform step 401 to determine the first angular power spectrum, determine the first high frequency beam scanning range based on the first angular power spectrum, and scan the first high frequency beam scanning range for the high frequency beam. On the contrary, if the whitelist does not include information about the access network device, and the information about the access network device is included in a blacklist, the terminal does not scan for, in the manner shown in FIG. 4, the high frequency beam sent by the access network device.

The information about the access network device may be used to indicate the access network device, for example, may be an internet protocol (internet protocol, IP) address of the access network device, or may be media access control (media access control, MAC) of the access network device, or may be other information used to identify the access network device. This is not limited.

The whitelist may include information about one or more access network devices, and the access network device included in the whitelist may perform high frequency communication with the terminal, or may perform low frequency communication with the terminal. In addition, a channel characteristic when the access network device performs high frequency communication with the terminal is basically the same as a channel characteristic when the access network device performs low frequency communication with the terminal.

For example, when the terminal accesses an access network device for the first time, the terminal may scan for, in existing phases P1 to P3, a high frequency beam delivered by the access network device, and scan for the high frequency beam in the manner shown in FIG. 4. If the high frequency beam determined by scanning in the phases P1 to P3 is the same as the high frequency beam find by the terminal in the manner shown in FIG. 4, the terminal determines to add information about the access network device to the whitelist. Subsequently, if the terminal needs to manage the high frequency beam of the access network device, the terminal may view the whitelist. When the terminal finds that the whitelist includes the information about the access network device, the terminal directly manages the high frequency beam of the access network device management in the manner shown in FIG. 4, and does not need to scan for, in the phases P1 to P3, the high frequency beam delivered by the access network device.

On the contrary, if the high frequency beam determined by scanning in the phases P1 to P3 is different from the high frequency beam found by the terminal in the manner shown in FIG. 4, or the access network device fails to send the high frequency beam to the terminal for a plurality of times in the angle range of the low frequency channel, it indicates that the high frequency beam cannot be found by using the channel characteristic of the low frequency channel in a range centered on the angle of the low frequency channel, and the access network device is added to the blacklist. Subsequently, if the terminal needs to manage the high frequency beam of the access network device in the blacklist, the terminal may scan for, in the existing phases P1 to P3, the high frequency beam delivered by the access network device.

The blacklist may include information about one or more access network devices that do not support beam scanning by using the channel characteristic of the low frequency channel. When the terminal determines that the information about the access network device is not included in the blacklist, the terminal performs step 401 to determine the first angular power spectrum, determine the first high frequency beam scanning range based on the first angular power spectrum, and scan the first high frequency beam scanning range for the high frequency beam. On the contrary, if the terminal determines that the information about the access network device is included in the blacklist, the terminal does not scan for, in the manner shown in FIG. 4, the high frequency beam sent by the access network device, but scans for, in the existing phases P1 to P3, the high frequency beam delivered by the access network device.

For example, the whitelist includes {an access network device 1 and an access network device 2}, and the blacklist includes {an access network device 4 and an access network device 5}. Before scanning for the high frequency beam sent by the access network device 1, the terminal may view the whitelist. If the terminal finds that the set includes information about the access network device 1, the terminal may determine the first high frequency beam scanning range in the manner shown in step 402 and step 403, and scan the first high frequency beam scanning range for a high frequency beam sent by the access network device 1. Before scanning for a high frequency beam sent by an access network device 3, the terminal views the whitelist, and finds that the set does not include information about the access network device 3. In addition, the terminal views the blacklist, and finds that the blacklist includes information about the access network device 4. In this case, the terminal does not scan for the high frequency beam in the manner shown in step 402 and step 403, but scans for, in the existing phases P1 to P3, a high frequency beam delivered by the access network device 3.

In a third embodiment of the method shown in FIG. 4, in a time period after the terminal performs step 401 and before step 402, the terminal is likely to rotate. Consequently, the first angular power spectrum between the terminal and the access network device changes. To avoid a problem that the angular power spectrum of the low frequency channel changes after the terminal rotates, and the first high frequency beam scanning range determined based on the angular power spectrum of the low frequency channel has a relatively large error, the method may further include:

The terminal determines whether the terminal rotates, and if the terminal rotates, the terminal corrects the first angular power spectrum based on a rotation angle of the terminal. Further optionally, the terminal calculates the PAR of the low frequency channel based on the corrected first angular power spectrum, determines the first high frequency beam scanning range based on the PAR of the low frequency channel, and scans for, in the first high frequency beam scanning range, the high frequency beam sent by the access network device.

The terminal may detect, by using a sensor (a gyro sensor, a magnetometer sensor, an acceleration sensor, and the like) installed on the terminal, whether the terminal rotates. Specifically, for a detection process, refer to the conventional technology. Details are not described again.

That the terminal corrects the first angular power spectrum based on a rotation angle of the terminal may include: The terminal rotates the first angular power spectrum based on the rotation angle of the terminal, so that a rotation angle of the first angular power spectrum is the same as the rotation angle of the terminal.

Figure 6:
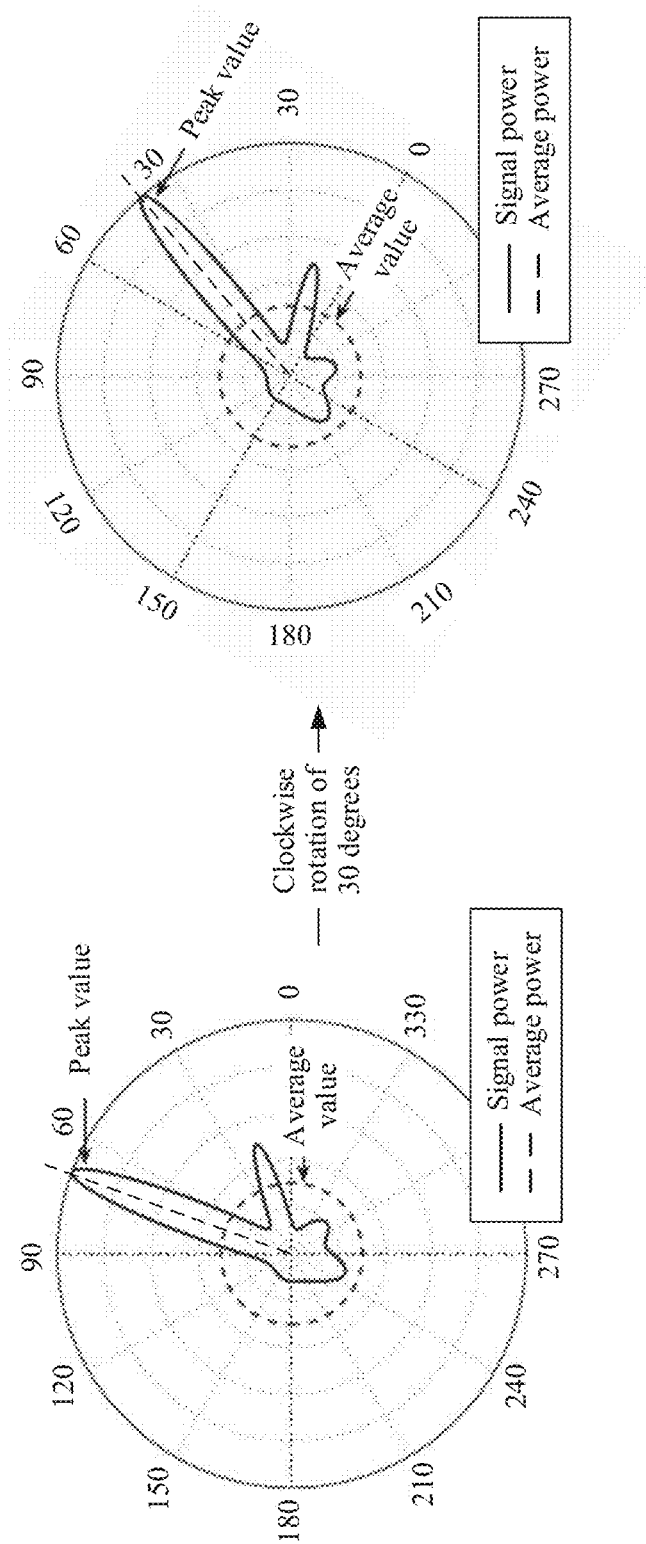
FIG. 6 is a schematic diagram of an angle power spectrum change when a terminal rotates according to an embodiment of this application.

For example, as shown in FIG. 6, when the terminal rotates by 30 degrees, the angular power spectrum also rotates by 30 degrees. For example, the angle of the low frequency channel corresponding to a maximum peak value rotates from about 70 degrees to about 40 degrees, and the angle of the low frequency channel corresponding to the second largest peak value rotates from about 25 degrees to about 15 degrees. The PAR is still kept at about 4.5. In this case, the terminal may scan for the high frequency beam in a range of 35 degrees to 45 degrees, and scan for the high frequency beam at about 10 degrees to 20 degrees.

In this way, when the terminal rotates, the first angular power spectrum can be corrected in time, to ensure accuracy of the first angular power spectrum, and further improve accuracy of the first high frequency beam scanning range determined based on the first angular power spectrum.

In a fourth embodiment of the method shown in FIG. 4, after step 401, the terminal is likely to move. Consequently, the channel characteristic of the low frequency channel between the terminal and the access network device changes. To avoid a problem that the angular power spectrum of the low frequency channel changes due to the change of the channel characteristic between the terminal and the access network device after the terminal moves, and the first high frequency beam scanning range determined based on the angular power spectrum has a relatively large error, the method may further include:

The terminal determines whether the terminal moves. If the terminal moves and a moving distance of the terminal is greater than a channel correlation distance, it indicates that the channel characteristic of the low frequency channel between the terminal and the access network device changes, and the terminal needs to re-determine the angular power spectrum of the low frequency channel transmitted between the terminal and the access network device. For example, the terminal determines a second angular power spectrum of the low frequency channel transmitted between the terminal and the access network device. Further optionally, the terminal determines a second high frequency beam scanning range based on the re-determined angular power spectrum (for example, the second angular power spectrum), and scans the second high frequency beam scanning range for the high frequency beam sent by the access network device.

If the terminal does not move, or the terminal moves, but the moving distance is less than or equal to the channel correlation distance, the terminal may determine the first high frequency beam scanning range based on the angular power spectrum determined in step 401, and scan the first high frequency beam scanning range for the high frequency beam sent by the access network device.

The terminal may detect, by using a sensor (a gyro sensor, a magnetometer sensor, an acceleration sensor, a gravity sensor, and the like) installed on the terminal, whether the terminal moves. For example, if a value collected by any sensor changes and a change value is greater than or equal to a threshold, it is determined that the terminal moves, or if values collected by all sensors do not change, or if values collected by the sensors change, but the change values are less than or equal to a threshold, it is determined that the terminal does not move.

The channel correlation distance may be a standard for measuring whether basic channel characteristics change. In the channel correlation distance, the basic channel characteristics (such as a delay, an angle, and polarization) remain unchanged. If the channel correlation distance is exceeded, the basic channel characteristics (such as the delay, the angle, and the polarization) change. After the channel correlation distance is exceeded, the first angle power spectrum needs to be re-determined, and an optimal high frequency beam may also change, and a high frequency beam needs to be re-selected.

In this embodiment of this application, the channel correlation distance may be determined based on a channel scenario in which the terminal is currently located, and different channel scenarios correspond to different channel correlation distances. For example, Table 1 shows a correspondence between a channel scenario and a channel correlation distance. As shown in Table 1, using a rural area as an example, in a LOS scenario, the channel correlation distance is 50 m, in an NLOS scenario, the channel correlation distance is 60 m, and in an indoor to outdoor (outdoor-to-indoor, O2I) scenario, the channel correlation distance is 15 m.

If the moving distance of the terminal is less than or equal to the channel correlation distance, it indicates that even if the terminal moves, the channel characteristic of the low frequency channel does not change greatly before and after the terminal moves, and the first high frequency beam scanning range may still be determined by using the previously determined first angular power spectrum. On the contrary, if the moving distance of the terminal is greater than the channel correlation distance, it indicates that the channel characteristic of the low frequency channel changes greatly after the terminal moves, and the previously determined first angular power spectrum cannot reflect the channel characteristic of the low frequency channel after moving. In this case, the terminal needs to perform step 401 again to re-determine the first angular power spectrum. Therefore, the terminal obtains a new first high frequency beam scanning range based on the re-determined first angular power spectrum, and scans the new first high frequency beam scanning range for the high frequency beam sent by the access network device.

equal to 2, the terminal determines that the communication scenario in which the terminal is currently located is a scenario in which a common reflection exists, for example, sparse vegetation. When the peak-to-average ratio is less than 2 and is greater than or equal to 1, the terminal determines that the communication scenario in which the terminal is currently located is a scenario in which common occlusion exists, for example, a scattering scenario. When the peak-to-average ratio is less than 1, the terminal determines that the current communication scenario in which the terminal is located is a scenario in which dense vegetation and complete occlusion exist.

It should be noted that, an example in which the terminal scans for the high frequency beam sent by the access network device is used for description. As an inverse process of downlink high frequency beam management, the access network device may alternatively scan for a high frequency beam sent by the terminal in the manner shown in FIG. 4. For example, the terminal sends the high frequency beam (or referred to as an uplink high frequency beam) to the access network device. The access network device calculates a peak-to-average ratio of a low frequency channel, determines a high frequency beam scanning range based on the peak-to-average ratio of the low frequency channel, and scans the determined high frequency beam scanning range for the high frequency beam sent by the terminal. Specifically, for a detailed description of the process, refer to FIG. 7. Details are not described again.

Figure 7:
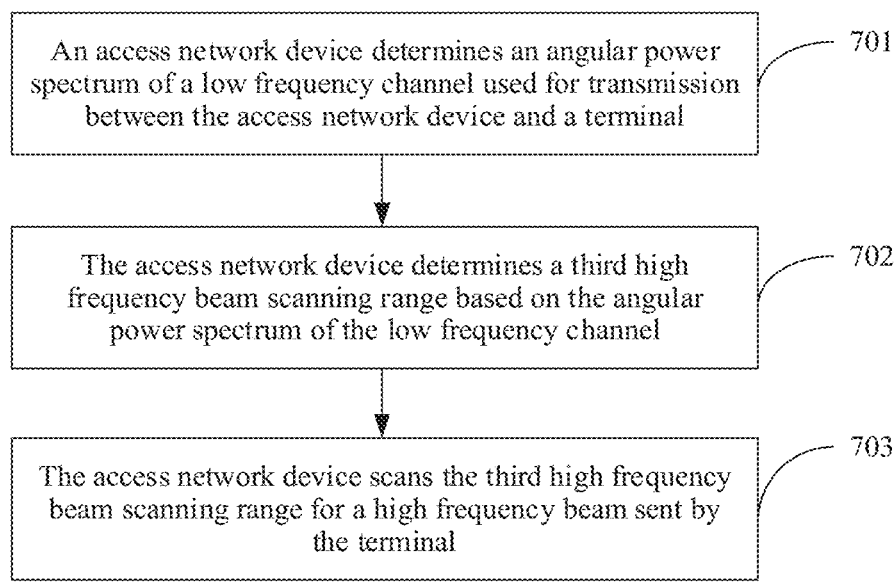
FIG. 7 is a flowchart of another beam selection method according to an embodiment of this application.

FIG. 7 is another beam selection method according to an embodiment of this application. As shown in FIG. 7, the method may include the following steps.

Step 701: An access network device determines an angular power spectrum of a low frequency channel transmitted between the access network device and a terminal.

For step 701, refer to step 401. For example, the low frequency channel transmitted between the access network device and the terminal is a low frequency channel (or referred to as an uplink low frequency channel) sent by the terminal to the access network device, and the access network device may determine a DOA power spectrum of

TABLE 1

| | Channel scenario | | | | | | | | |
|---|---|---|---|---|---|---|---|---|---|
| | Rural area | | | City | | | Urban area | | |
| | LOS | NLOS | O2I | LOS | NLOS | O2I | LOS | NLOS | O2I | Indoor |
| Channel correlation distance (m) | 50 | 60 | 15 | 12 | 15 | 15 | 40 | 50 | 15 | 10 |

For example, in this embodiment of this application, the channel scenario in which the terminal is currently located may be determined based on the first angular power spectrum. For example, the terminal may calculate the peak-to-average ratio of the low frequency channel based on the first angular power spectrum, and determine the channel scenario in which the terminal is currently located based on the PAR of the low frequency channel. When the peak-to-average ratio is greater than or equal to 4, the terminal determines that the channel scenario in which the terminal is currently located is the LOS scenario. When the peak-to-average ratio is less than 4 and is greater than or equal to 3, the terminal determines that a current communication scenario in which the terminal is located is a strong transmission scenario, for example, a smooth glass or a metal surface. When the peak-to-average ratio is less than 3 and is greater than or the low frequency channel. Alternatively, when there is reciprocity between a channel sent by the terminal to the access network device and a channel sent by the access network device to the terminal, the low frequency channel transmitted between the access network device and the terminal is a low frequency channel (or referred to as a downlink low frequency channel) sent by the access network device to the terminal, and the access network device may determine a DOD power spectrum of the low frequency channel. In this way, a high frequency beam (or referred to as an uplink high frequency beam) sent by the terminal to the access network device may be determined by using a channel characteristic of the downlink low frequency channel.

Specifically, for a detailed description of step 701, refer to step 401. Details are not described again.

Step 702: The access network device determines a third high frequency beam scanning range based on the angular power spectrum of the low frequency channel determined in step 701.

For step 702, refer to step 402. For example, the access network device may calculate a peak-to-average ratio of the low frequency channel based on the determined angular power spectrum, and determine the third high frequency beam scanning range based on the peak-to-average ratio of the low frequency channel and a correspondence between the peak-to-average ratio and a high frequency beam region range.

For a correspondence between the peak-to-average ratio and the high frequency beam region range, and a detailed process in which the access network device determines the third high frequency beam scanning range, refer to step 402. Details are not described again.

Step 703: The access network device scans the third high frequency beam scanning range determined in step 702 for the high frequency beam sent by the terminal.

For step 703, refer to step 403. Details are not described again.

Based on the method shown in FIG. 7, when scanning the high frequency beam sent by the terminal, the access network device may determine, based on the angular power spectrum of the low frequency channel, the third high frequency beam scanning range, and scan the third high frequency beam scanning range for the high frequency beam sent by the terminal. In this way, the access network device may scan a specific range for the high frequency beam, and does not need to scan a large range for the high frequency beam by using three phases P1 to P3 as in the conventional technology. Compared with the conventional technology, the method provided in FIG. 7 reduces a scanning time. In addition, signaling interaction with the terminal does not need to be performed for a plurality of times, thereby reducing signaling overheads.

The method shown in FIG. 4 is described below by using an example in which the terminal determines a high frequency beam scanning range based on an angular power spectrum of a low frequency channel, and scans the determined high frequency beam scanning range for a high frequency beam sent by the access network device.

Figure 8:
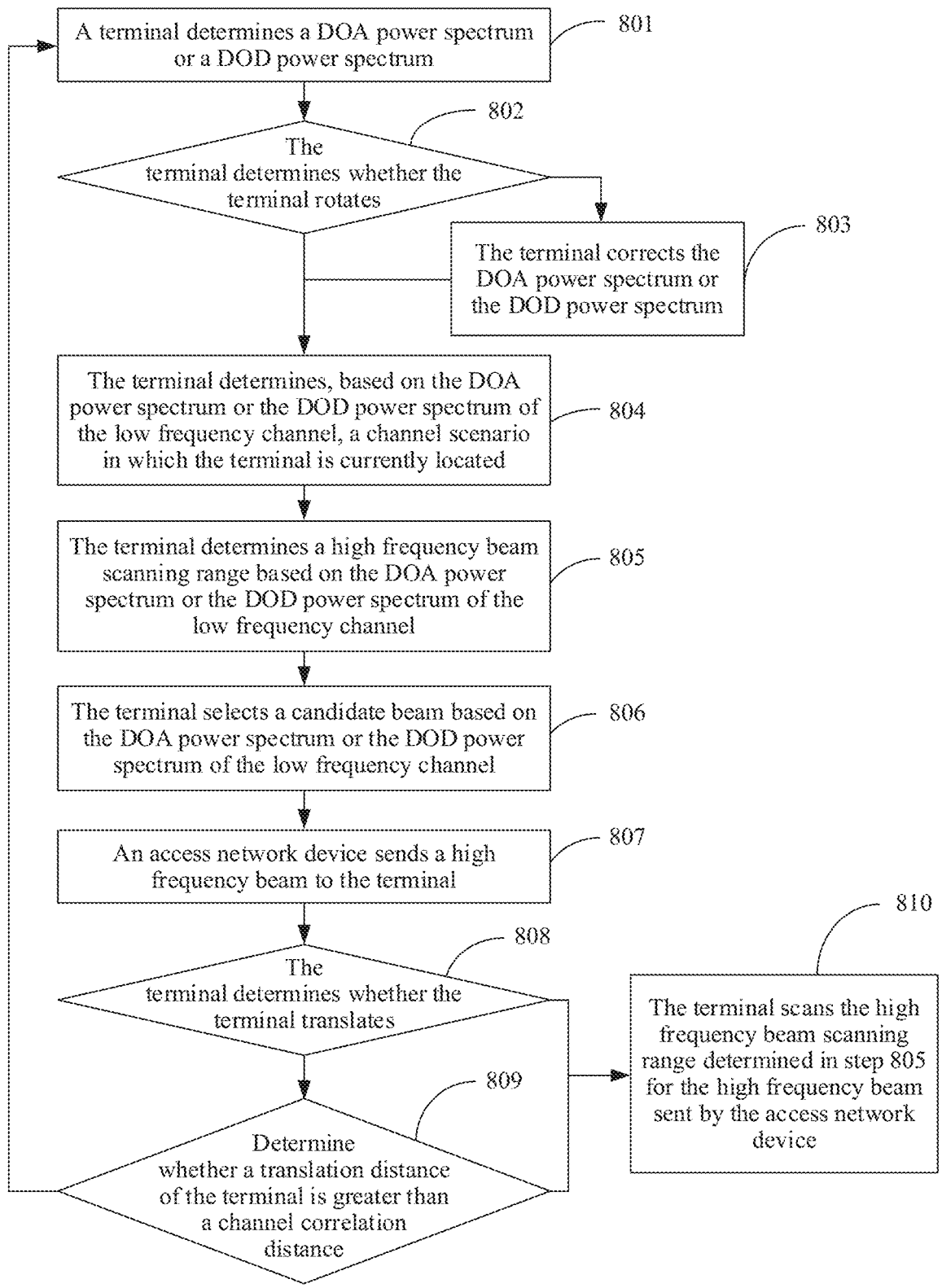
FIG. 8 is a flowchart of still another beam selection method according to an embodiment of this application.

FIG. 8 is a beam selection method according to an embodiment of this application. As shown in FIG. 8, the method may include the following steps.

Step 801: A terminal receives a low frequency channel sent by an access network device, and determines to obtain a DOA power spectrum of the low frequency channel; or a terminal sends a low frequency channel to an access network device, to determine a DOD power spectrum of the low frequency channel.

For step 801, refer to step 401. Details are not described again.

For a manner in which the access network device sends the high frequency beam to the terminal, refer to step 403. Details are not described again.

Step 802: The terminal determines whether the terminal rotates. If the terminal rotates, step 803 is performed. If the terminal does not rotate, step 804 is performed.

For a manner in which the terminal determines whether the terminal rotates, refer to the description in the embodiment shown in FIG. 4. Details are not described again.

Step 803: The terminal corrects the DOA power spectrum or the DOD power spectrum of the low frequency channel based on a rotation angle of the terminal.

For a manner in which the terminal corrects the DOA power spectrum or the DOD power spectrum of the low frequency channel, refer to the third embodiment of the method shown in FIG. 4. Details are not described again.

Step 804: The terminal determines, based on the DOA power spectrum or the DOD power spectrum of the low frequency channel, a channel scenario in which the terminal is currently located.

The channel scenario may include a LOS scenario, an NLOS scenario, an O2I scenario, and the like.

Specifically, for a detailed process in which the terminal determines the channel scenario based on the DOA power spectrum or the DOD power spectrum of the low frequency channel, refer to the fourth embodiment of the method shown in FIG. 4. Details are not described again.

Step 805: The terminal determines a high frequency beam scanning range based on the DOA power spectrum or the DOD power spectrum of the low frequency channel.

For step 805, refer to step 402. Details are not described again.

Step 806: The terminal selects a candidate beam based on the DOA power spectrum or the DOD power spectrum of the low frequency channel.

For an execution process of step 806, refer to the description in the first embodiment of the method shown in FIG. 4. Details are not described again.

Step 807: The access network device sends the high frequency beam to the terminal.

Step 808: The terminal determines whether the terminal translates. If the terminal translates, step 809 is performed. If the terminal does not translate, step 810 is performed.

For a manner in which the terminal determines whether the terminal translates, refer to the description in the embodiment shown in FIG. 4. Details are not described again.

Step 809: Determine whether a translation distance of the terminal is greater than a channel correlation distance. If the translation distance of the terminal is greater than the channel correlation distance, step 801 is performed again; otherwise, if the translation distance of the terminal is less than or equal to the channel correlation distance, step 810 is performed.

The terminal may determine the channel correlation distance based on the channel scenario in which the terminal is currently located and that is determined in step 804.

Step 810: The terminal scans the high frequency beam scanning range determined in step 805 for the high frequency beam sent by the access network device.

Further optionally, if the terminal fails to scan the determined high frequency beam scanning range for the high frequency beam sent by the access network device, or successfully scans, in the determined high frequency beam scanning range, the high frequency beam sent by the access network device, but fails to receive data, the terminal may communicate with the access network device on the candidate beam selected in step 806.

Based on the method shown in FIG. 8, when scanning for the high frequency beam delivered by the access network device, the terminal may determine whether the terminal rotates, and if the terminal rotates, correct the angular power spectrum of the low frequency channel, thereby improving accuracy of the angular power spectrum of the low frequency channel and ensuring accuracy of the determined high frequency beam scanning range. Subsequently, before scanning the high frequency beam in the high frequency beam scanning range, the terminal determines whether the terminal translates, and determines, based on a translation status of the terminal, whether to scan the previously calculated high frequency beam scanning range for the high frequency beam or to recalculate the high frequency beam scanning range, so as to improve accuracy of high frequency beam scanning.

The foregoing mainly describes the solutions provided in the embodiments of this application from a perspective of interaction between nodes. It may be understood that, to implement the foregoing functions, the nodes such as the access network device and the terminal include corresponding hardware structures and/or software modules for performing the functions. A person skilled in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, functional modules of the access network device and the terminal may be divided based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 9:
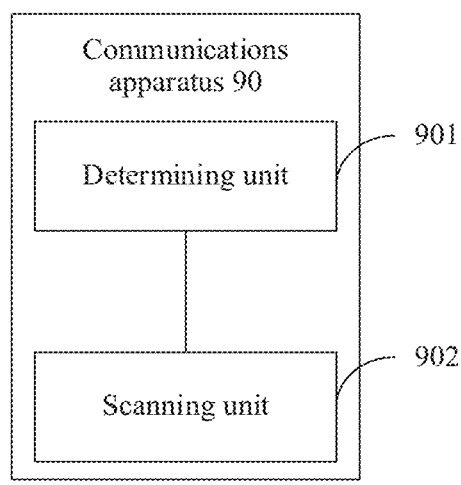
FIG. 9 is a schematic composition diagram of a communications apparatus 90 according to an embodiment of this application.

FIG. 9 is a schematic structural diagram of a communications apparatus 90 according to an embodiment of this application. The communications apparatus in this embodiment may be a terminal, a chip in a terminal, or a system-on-a-chip. The communications apparatus 90 may be configured to perform a function of the terminal in the foregoing method embodiments. In an implementation, as shown in FIG. 9, the communications apparatus 90 may include a determining unit 901 and a scanning unit 902.

The determining unit 901 is configured to determine a first angular power spectrum of a low frequency channel transmitted between a terminal and an access network device. For example, the determining unit 901 may be configured to support the communications apparatus 90 in performing step 401 and step 801.

The determining unit 901 is further configured to determine a first high frequency beam scanning range based on the first angular power spectrum. For example, the determining unit 901 may be further configured to support the communications apparatus 90 in performing step 402 and step 804.

The scanning unit 902 is configured to scan the determined first high frequency beam scanning range for a high frequency beam sent by the access network device. For example, the scanning unit 902 may be configured to support the communications apparatus 90 in performing step 403 and step 810.

Specifically, the communications apparatus 90 provided in this embodiment of this application may perform actions of the terminal in the method embodiment corresponding to FIG. 4 or FIG. 8. Implementation principles and technical effects thereof are similar. Details are not described herein again.

In another possible implementation, the communications apparatus 90 shown in FIG. 9 may include a processing module and a communications module. The processing module may integrate functions of the determining unit 901 and the scanning unit 902. The processing module is configured to support the communications apparatus 90 in performing step 401 to step 403 and an action of the terminal in the method shown in FIG. 8, and control and management of the action of the communications apparatus 90. The communications module is configured to support the communications apparatus 90 to communicate with another network entity, for example, communicate with the access network device. Further, the communications apparatus 90 shown in FIG. 9 further includes a storage module, configured to store program code and data of the communications apparatus 90.

The processing module may be a processor or a controller. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 90 shown in FIG. 9 may be the communications apparatus shown in FIG. 3.

Figure 10:
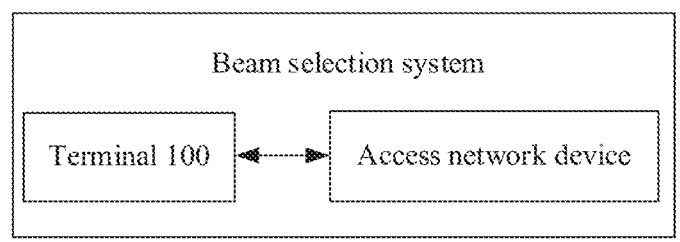
FIG. 10 is a schematic composition diagram of a beam selection system according to an embodiment of this application.

FIG. 10 is a schematic structural diagram of a beam selection system according to an embodiment of this application. As shown in FIG. 10, the system may include a terminal 100 and an access network device.

A function of the terminal 100 is the same as that of the communications apparatus 90 shown in FIG. 9. For example, the terminal 100 may be configured to: determine a first angular power spectrum of a low frequency channel transmitted between the terminal and the access network device, determine a first high frequency beam scanning range based on the first angular power spectrum, and scan the first high frequency beam scanning range for a high frequency beam sent by the access network device.

Specifically, the communications system provided in the embodiments of this application may perform the method embodiments corresponding to FIG. 3 to FIG. 6. Implementation principles and technical effects thereof are similar, and details are not described again.

The foregoing description about the implementations allows a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An angular power spectrum method implemented by a device, wherein the method comprises:
   determining a first angular power spectrum of a first low frequency channel transmitted between the device and an access network device;
   determining a first high frequency beam scanning range based on the first angular power spectrum; and
   scanning the first high frequency beam scanning range for a high frequency beam of the access network device.

2. The method of claim 1, further comprising:
   calculating a peak-to-average ratio of the first low frequency channel based on the first angular power spectrum;
   determining, based on the peak-to-average ratio and a correspondence between the peak-to-average ratio and a high frequency beam region range, a first region range corresponding to the peak-to-average ratio; and
   further determining the first high frequency beam scanning range based on the first region range and an angle of a second low frequency channel, wherein a peak value of the second low frequency channel is at a first threshold that is preset.

3. The method of claim 1, wherein the first angular power spectrum is a direction of arrival (DOA) power spectrum or a direction of departure (DOD) power spectrum.

4. The method of claim 1, wherein before determining the first high frequency beam scanning range, the method further comprises:
   determining a rotation angle of the device; and
   correcting the first angle power spectrum based on the rotation angle.

5. The method of claim 1, wherein after determining the first angular power spectrum, the method further comprises determining a second angular power spectrum of the first low frequency channel when the device moves and a moving distance of the device is greater than a channel correlation distance, wherein the channel correlation distance is based on a channel scenario in which the device is currently located, and wherein the channel scenario is based on the first angular power spectrum.

6. The method of claim 5, further comprising:
   determining, based on the second angular power spectrum, a second high frequency beam scanning range; and
   scanning the second high frequency beam scanning range for the high frequency beam.

7. The method of claim 1, further comprising:
   making a determination that a whitelist at the device comprises information about the access network device that supports beam scanning using a channel characteristic of the first low frequency channel; and
   further determining, in response to the determination, the first angular power spectrum.

8. The method of claim 1, further comprising:
   making a determination that first information about the access network device is not comprised in a blacklist at the device; and
   further determining, in response to the determination, the first angular power spectrum.

9. The method of claim 1 further comprising selecting a candidate beam based on the first angular power spectrum.

10. A communications apparatus, wherein the communications apparatus is a terminal or an access network device, a functional component of the terminal or the access network device, or a chip in the terminal or the access network device, and wherein the communications apparatus comprises:
    a memory configured to store instructions; and
    a processor coupled to the memory, wherein the instructions cause the processor to be configured to:
        determine a first angular power spectrum of a first low frequency channel transmitted between the terminal and the access network device;
        determine a first high frequency beam scanning range based on the first angular power spectrum; and
        scan the first high frequency beam scanning range for a high frequency beam of the access network device.

11. The communications apparatus of claim 10, wherein the instructions further cause the processor to be configured to:
    calculate a peak-to-average ratio of the first low frequency channel based on the first angular power spectrum;
    determine, based on the peak-to-average ratio and a correspondence between the peak-to-average ratio and a high frequency beam region range, a first region range corresponding to the peak-to-average ratio; and determine the first high frequency beam scanning range based on the first region range and an angle of a second low frequency channel, wherein a peak value of the second low frequency channel is at a first threshold that is preset.

12. The communications apparatus of claim 10, wherein the first angular power spectrum is a direction of arrival (DOA) power spectrum or a direction of departure (DOD) power spectrum.

13. The communications apparatus of claim 10, wherein before determining the first high frequency beam scanning range, the instructions further cause the processor to be configured to:
    determine a rotation angle of the terminal; and
    correct the first angular power spectrum based on the rotation angle.

14. The communications apparatus of claim 10, wherein after determining the first angular power spectrum, the instructions further cause the processor to be configured to determine a second angular power spectrum of the first low frequency channel when the terminal moves and a moving distance of the terminal is greater than a channel correlation distance, wherein the channel correlation distance is based on a channel scenario in which the terminal is currently located, and wherein the channel scenario is based on the first angular power spectrum.

15. The communications apparatus of claim 14, wherein the instructions further cause the processor to be configured to:
    determine a second high frequency beam scanning range based on a re-determined angular power spectrum; and
    scan the second high frequency beam scanning range for the high frequency beam.

16. The communications apparatus of claim 10, wherein the instructions further cause the processor to be configured to:
    make a determination that a whitelist of the communications apparatus comprises information about the access network device that supports beam scanning using a channel characteristic of the first low frequency channel; and
    further determine, based on the determination, the first angular power spectrum.

17. The communications apparatus of claim 10, wherein the instructions further cause the processor to be configured to:
    make a determination that information about the access network device is not comprised in a blacklist of the communications apparatus; and
    determine, in response to the determination, the first angular power spectrum.

18. The communications apparatus of claim 10, wherein the instructions further cause the processor to be configured to select a candidate beam based on the first angular power spectrum.

19. A computer program product comprising computer-executable instructions that are stored on a non-transitory computer-readable storage medium and that, when executed by a processor, cause an apparatus to:
    determine a first angular power spectrum of a first low frequency channel transmitted between a terminal and an access network device;
    determine a first high frequency beam scanning range based on the first angular power spectrum; and
    scan the first high frequency beam scanning range for a high frequency beam of the access network device.

20. The computer program product of claim 19, wherein the computer-executable instructions further cause the apparatus to:
    calculate a peak-to-average ratio of the first low frequency channel based on the first angular power spectrum;
    determine, based on the peak-to-average ratio and a correspondence between the peak-to-average ratio and a high frequency beam region range, a first region range corresponding to the peak-to-average ratio; and
    further determine the first high frequency beam scanning range based on the first region range and an angle of a second low frequency channel, wherein a peak value of the second low frequency channel is at a first threshold that is preset.

* * * * *